United States Patent
Eskandr

(10) Patent No.: US 7,151,322 B2
(45) Date of Patent: Dec. 19, 2006

(54) TRANSPORTATION AND POWER GENERATING SYSTEM OF GRAVITY AND LEAF SPRINGS

(76) Inventor: Ashraf Makrm Dawoud Eskandr, 333 Park Ave. Apt. 24, Newark, NJ (US) 07107

( * ) Notice: Subject to any disclaimer, the term of this patent is extended or adjusted under 35 U.S.C. 154(b) by 0 days.

(21) Appl. No.: 11/042,843

(22) Filed: Jan. 25, 2005

(65) Prior Publication Data

US 2006/0163876 A1    Jul. 27, 2006

(51) Int. Cl.
F02B 63/04    (2006.01)
F03G 7/08    (2006.01)
H02K 7/18    (2006.01)

(52) U.S. Cl. ................................... 290/1 R
(58) Field of Classification Search ........... 290/1 R, 290/1 C, 1 D, 1 E, 28, 27, 32
See application file for complete search history.

(56) References Cited

U.S. PATENT DOCUMENTS

| | | | |
|---|---|---|---|
| 396,557 A * | 1/1889 | Flatz | 310/75 R |
| 410,964 A * | 9/1889 | Pitch | 310/69 |
| 1,389,424 A * | 8/1921 | De Brun | 248/544 |
| 3,204,110 A * | 8/1965 | Masuda | 290/42 |
| 4,452,045 A * | 6/1984 | Matlin et al. | 60/641.8 |
| 4,718,232 A * | 1/1988 | Willmouth | 60/495 |
| 5,001,357 A * | 3/1991 | Adams | 290/1 R |
| 5,432,382 A * | 7/1995 | Pawlowski | 290/1 R |
| 6,946,748 B1 * | 9/2005 | Love | 290/1 C |
| 2003/0132635 A1 * | 7/2003 | Ganimian | 290/1 R |
| 2003/0160454 A1 * | 8/2003 | Manolis et al. | 290/1 R |
| 2004/0178634 A1 * | 9/2004 | Eskandr | 290/1 R |
| 2005/0248159 A1 * | 11/2005 | Seoane | 290/1 R |

FOREIGN PATENT DOCUMENTS

DE    3200352 A1 *    1/1982

* cited by examiner

Primary Examiner—Julio Gonzalez

(57) ABSTRACT

Two weights and or springs mounted on two pivoted beams. A short end of each beam is interconnected with a gearbox by a crank and trace. The gearbox is interconnected with two other ends of the beams by linkages. An electric starter with battery imparts kinetic energy to lift one weight and let the other weight descend. The gearbox regulates the oscillation of two beams. The operator turns the electric starter off after the system is started. An output shaft imparts rotary motion of the gearbox to drive a vehicle, an airplane, or an AC generator.

8 Claims, 17 Drawing Sheets

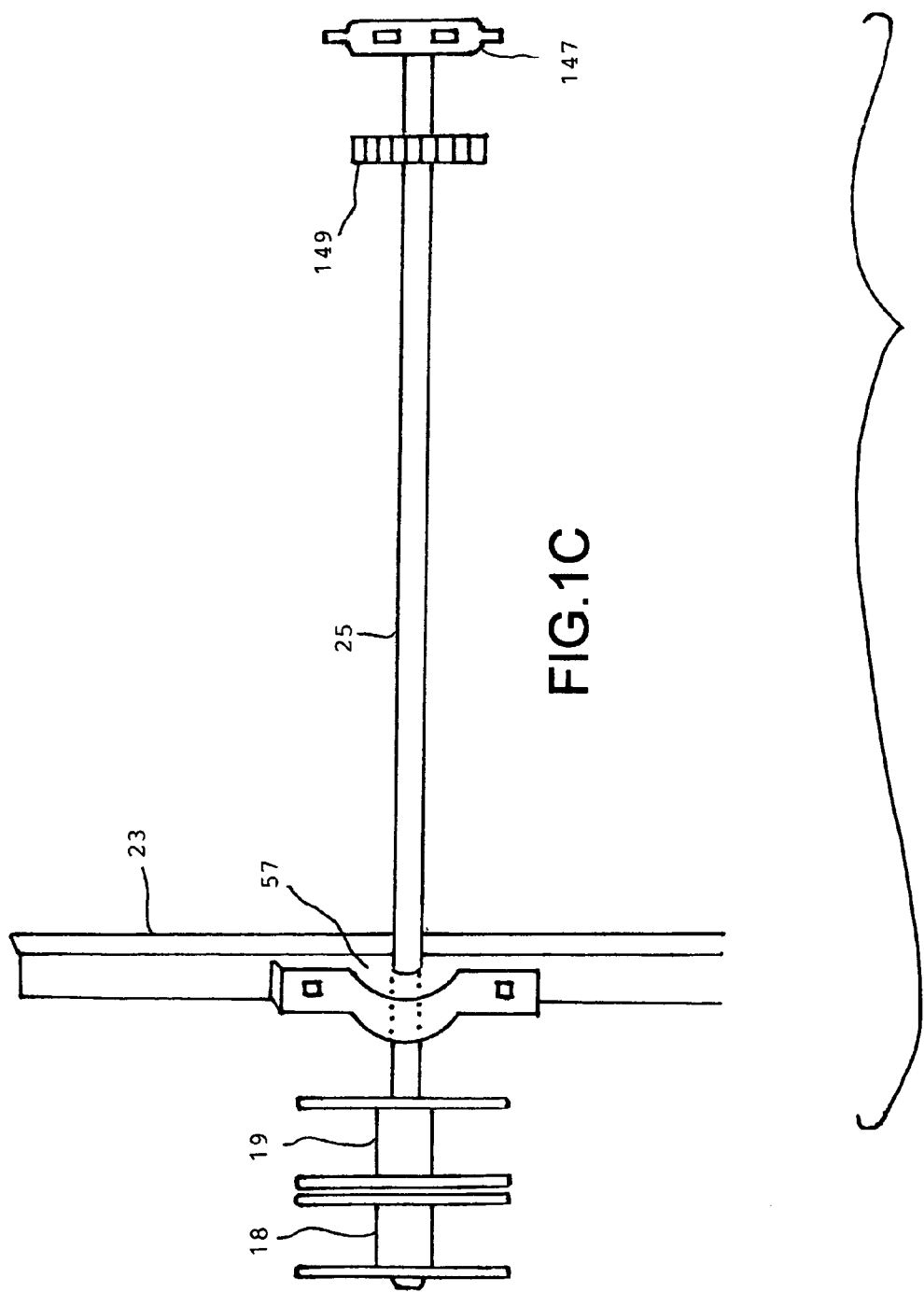

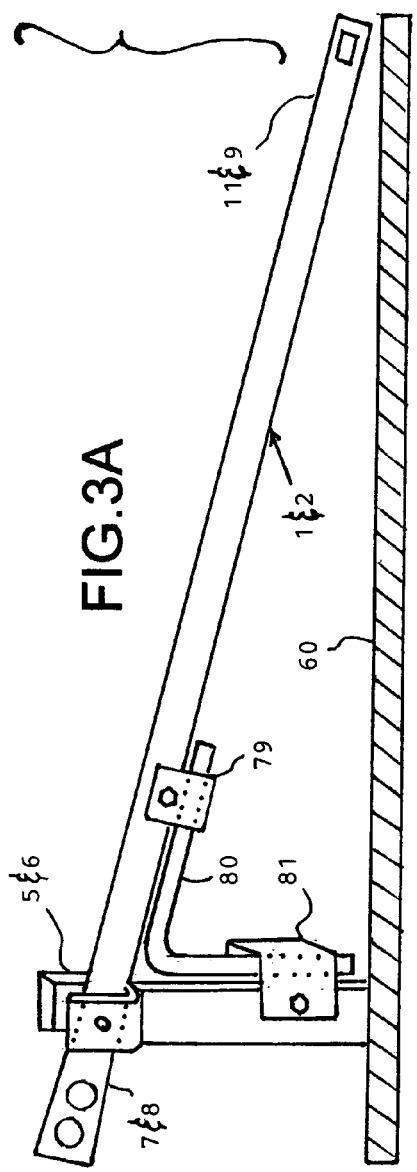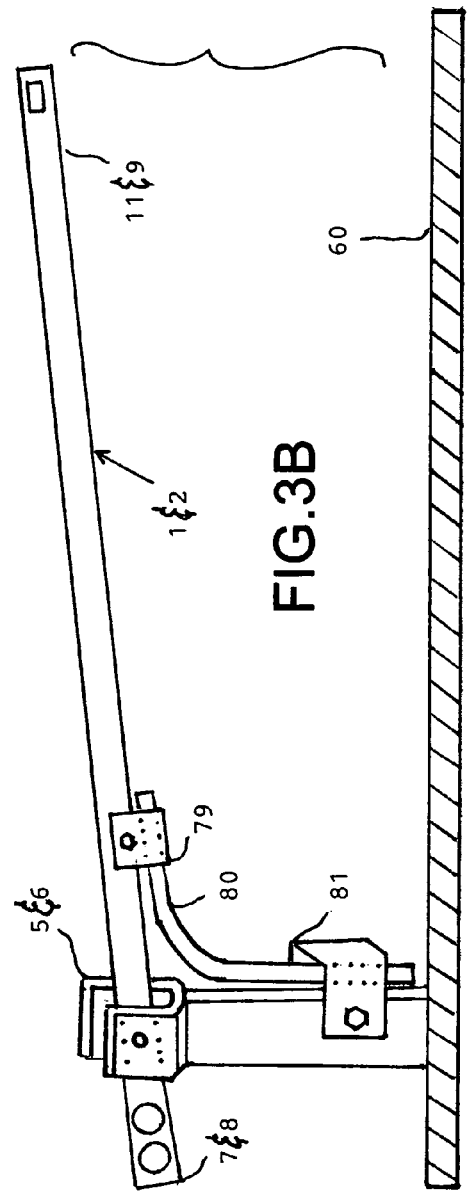

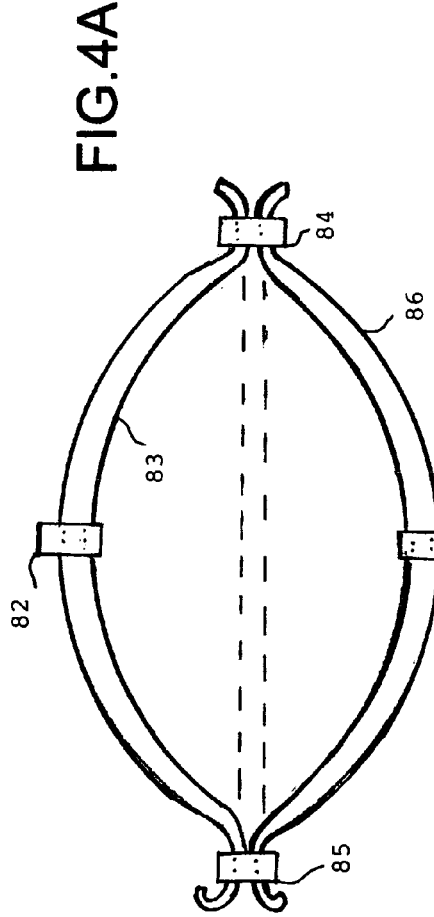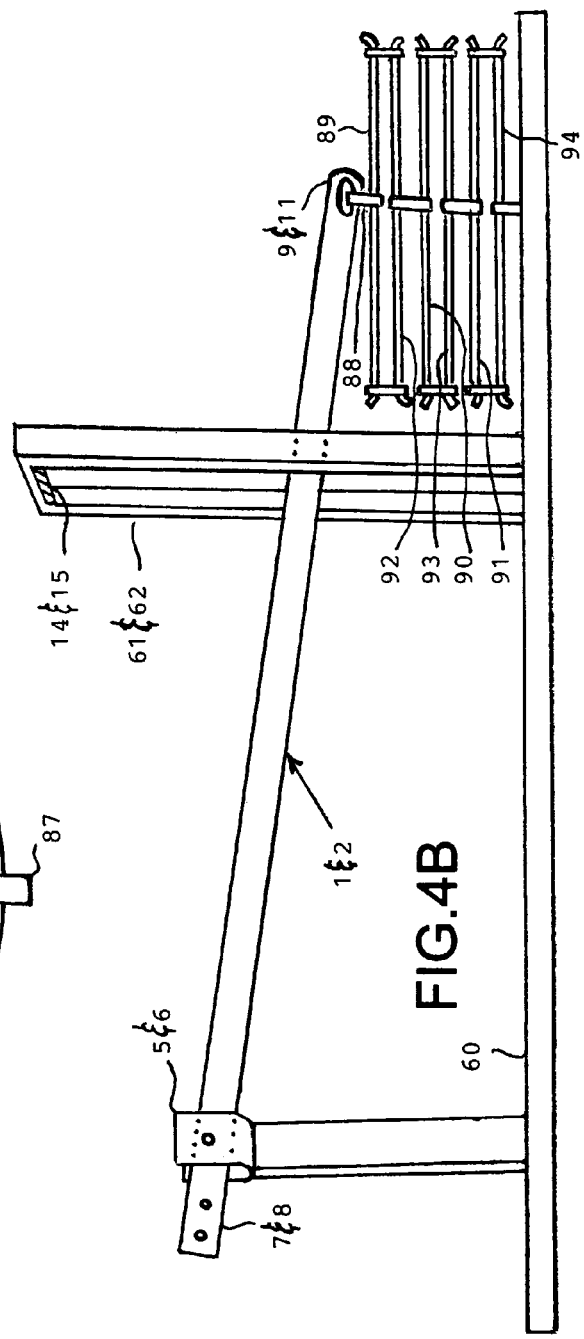

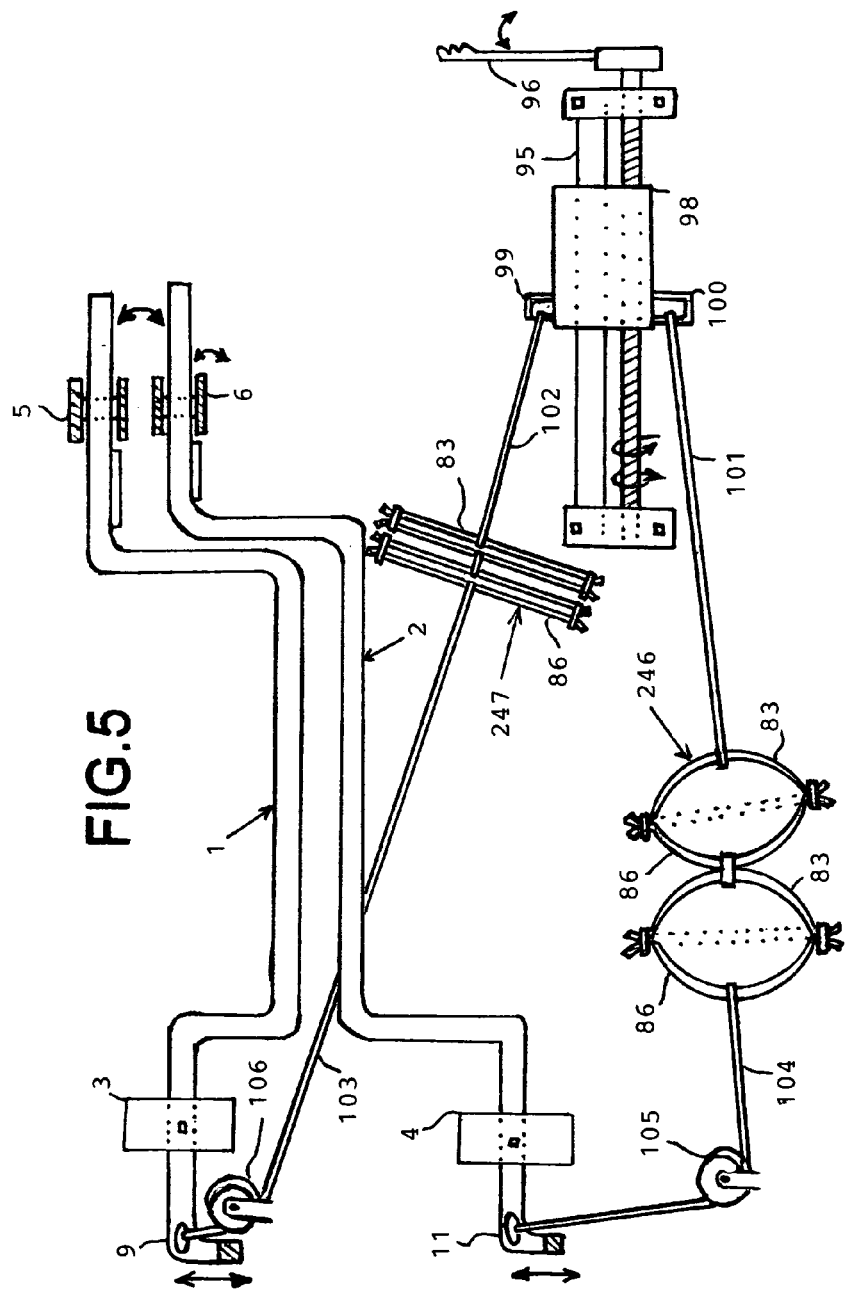

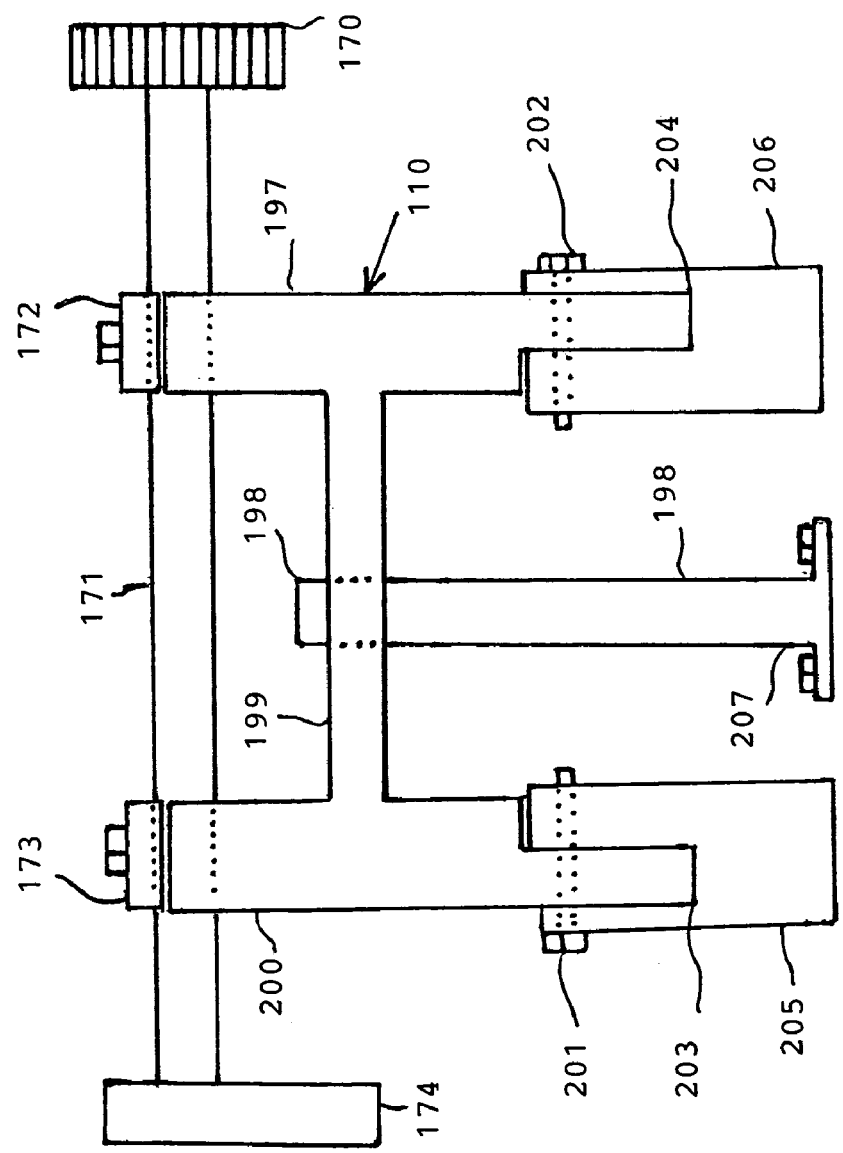

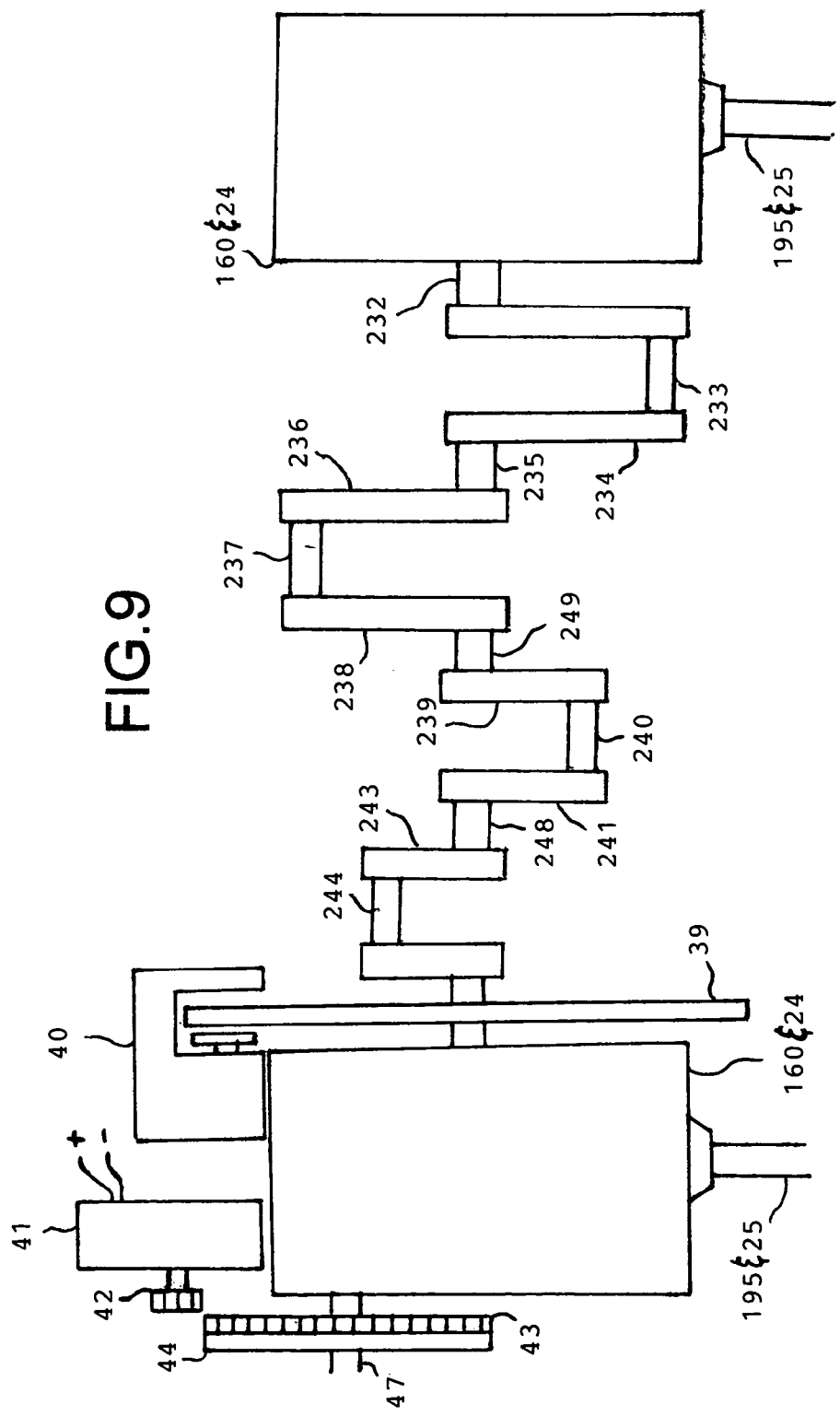

TRANSPORTATION AND POWER GENERATING SYSTEM OF GRAVITY AND LEAF SPRINGS

BACKGROUND OF THE INVENTION

The present invention relates to a mechanical system for generating rotary motion of gravity and strained leaf springs for driving a small car, a bus, a ship, and an air plane and also generation electricity by an AC generator.

The prior art as in the following patents:

U.S. Pat. No. 507,289 issued on Sep. 19, 1974 class 290/53 to Rusbey; Joseph V. A tide-powered electrical generator wherein the energy from successive rising tides is stored in the form of potential energy for selective conversion to electricity. A float is constrained to vertical motion and it raises on successive tide a weight by means of a jack bar to reach a maximum predetermined high on a stable support structure where the weight is supported until release for the generation of electricity. Provision is made for the prevention of damage to the generator by excessive tidal rises.

U.S. Pat. No. 670,697 class 185/30 issued on Mar. 26, 1976 to Schera, Jr.; Enos L. A shaft-driven power device, such as an electric generator or pump, is mounted on a base which is subjected to fluctuating movement, such as those of waves in a body of water or those of an automotive vehicle. An input shaft at the upper end of the power device is connected by a rigid arm to an off-center weight located just slightly above the base. The weight may be adjustable and replaceable. The power device may be spring-mounted on the base.

U.S. Pat. No. 034,231 class 290/1R issued on Apr. 30, 1979 to Chiappetti; Arthur B. In an energy producing system, a movable device is mounted at least partially within a housing which, in turn, is mounted in the ground at the surface of a road or the like. The movable device at least partially extends through an opening in the housing and is positioned transversely within the path of travel of vehicles moving along the road for engaging the vehicles seriatim to be set into motion thereby. A coupling device connects drivingly the movable device and a generating device for transmitting drivingly the motion of the movable device to the generating device, such as an electrical generator. A flywheel is installed for rotation about its axis for storing the energy in response to the movable device to provide a more continuous production of energy from the generating device.

U.S. Pat. No. 124,172 class 290/1R issued on Jan. 25, 1988 to Sen; Asim K. This invention relates to a scheme for generating electricity using gravitational energy. The scheme uses a set of massive underground spinning wheels, each wheel being fitted with a mechanism to receive and transmit gravitational torque pulses from a passing vehicle to keep the wheels in motion. The mechanism used to apply the torque pulses to the spinning wheels consists of a stepping board, a hollow cylindrical rod disposed vertically and a shoe attached to the lower end of the vertical rod by a hinge with the upper end of the rod protruding above the ground surface. A steel linkage connecting the stepping board and the lower part of the shoe is used for initial positioning of the shoe. Both the stepping board and the protruding end of the vertical rod are kept in their initial upward positions by means of two springs. The electricity is generated by using each spinning wheel in combination with an appropriate gear system to act as the prime mover of an alternator.

U.S. Pat. No. 4,452,045 issued on June 1984 class 60/641 to Matlin describes, coupling a solar array to a device with fluctuating power requirements through a mechanical energy accumulator to smooth power demand.

U.S. Pat. No. 4,450,362 issued on May 1984 class 290/55 to Gallagher describes, a windmill drives a drum having a cable coil thereon, the cable holding a weight. The windmill lifts the weight, and the weight on dropping drives an AC generator. A plurality of drums and weights are mounted on a first common shaft connected with the AC generator, and a plurality of drive pulleys are mounted on a second common shaft connected with the windmill. Individual clutches selectively connect the Drums/weights with the first shaft for driving the AC generator, and individual clutches selectively connect the drive pulley with the second shaft.

U.S. Pat. No. 5,905,312 issued on May 18, 1999 class 60/639X to David Liou describes, a system generating electricity by gravity. This system includes a plurality of tanks mounted on a circulating device. When the tanks receive the working medium descending from a higher place by gravity. The circulating device is driven to circulate along a guiding device so as to drive a working shaft of a generator for generating electricity. A transmission mechanism is added between the circulating device and the working shaft to increase the rotational speed of the working shaft.

U.S. Pat. No. 5,929,531 issued on July 1999 class 290/53 to Lagno describes, a lunar tide powered hydroelectric plant of variable size and power generation capacity for basing on land or in tide waters. The basic collection of mechanical power is done by torsion spring bank units positioned on a concrete barge. The land-based plant obtain oscillatory motion from a notched frame. The tide water based plant obtains oscillating motion from notched piling. An individual torsion spring bank unit can comprise columns of horizontally aligned torsion springs based on a row of torsion springs of a bottom control cell. The tide and wave motion is transferred to the torsion spring banks.

A computer system manages the release of each torsion spring column to a drive shaft of a generator to produce electrical power. The computer system also permits the conversion of kinetic energy by reversing the gearing system for the upward motion of the floating barge so as to obtain a constant input of kinetic energy to the generator.

U.S. Pat. No. 2,518,129 issued on August 1950 class 290/53 to Eichorn describes in this invention, using a servo motor, hydraulic transmission, electronic regulator, And control generator for regulation the variable power input to AC generator to generate electric power at constant rate.

U.S. Pat. No. 5,001,357 issued on March 1991 class 290/1r to Adams describes, a linear gravitational generator is designed to produce electric current by induction. Primarily, it consists of a pair of coils wound upon cores, and an external drive source drives a pulley train that passes a multiple number of spaced magnetic buckets through the coils on a pair of cables of the pulley train, which induces electric current into the coil for industrial use and other application.

U.S. Pat. No. 4,661,716 issued on April 1987 class 290/53 to Chu describes, an unlimited and continuous pneumatic generating system to be driven with the sea-wave force. This system can effectively absorb the motive force of sea-waves from almost any direction, and can convert that force into a mechanical force, which is further converted into a pneumatic force. The pneumatic force is transmitted to the shore, being divided into two portions, of which one portion -A- is used for generating electric power, while the other portion -B- is to be stored up as a spare energy, which may be used upon having no sea-wave force to be absorbed from the sea for directly generating power.

In accordance with what mentioned in the prior art; the devices in the prior art can not be used for driving a transportation mean such as a car, a ship, and an airplane.

The prior art can not provide a power generating device having a portable small size to convert the gravity to rotary motion for production electricity.

The prior art uses variable power input from solar energy, wind energy, sea-wave energy, and passing vehicles on the road for generation electricity, therefore, the devices of the prior art can not generating electric power with constant rate at any time of the year.

Thus, a transportation and power generating system of gravity and leaf springs is solving the aforementioned problems.

BRIEF SUMMARY OF THE INVENTION

An object of the present invention is to provide a system for conversion gravity and mechanical energy of strained leaf springs and two equal weights to rotary motion to drive a car, an airplane, and a ship and their speed can be controlled by a hydraulic device, an electric device or a mechanical device as gearbox having five speeds.

Another object of the present invention is to provide a system for conversion the mechanical energy of two assemblages of strained leaf springs to rotary motion to drive an airplane, a car, and a ship instead of using any weight to be this system having light weight and great output.

Further object of the present invention is to provide a system for driving a vehicle and using a hollow wall for oscillation each system's beam inside that hollow wall which can be installed on the left, or middle that vehicle and also each beam of the system can take any shape according to the body's shape of the vehicle.

Another object of the present invention is to provide a system can combine with a second system by using a crankshaft to form one system can generate constant output for driving a heavy truck; and also to provide a system its brake device can be connected with a hydraulic or an air line of the brake of that truck for convenience driving, because, driver does not need using a clutch's pedal to decrease the speed.

An object of the present invention is to provide a system for conversion the potential energy of two equal weights to rotary motion without using leaf springs for generation electricity only with constant rate.

Further object of the present invention is to provide a system that is simple and easy to use and maintain.

An object of the present invention is to provide a system that is economical in cost to manufacture.

Another object of the present invention is to provide a system for production electrical power without polluting environment.

Further object of the present invention is to provide a system for generating kinetic energy for generation electricity at any time of a year with constant rate.

BRIEF DESCRIPTION OF THE SEVERAL VIEWS OF THE DRAWINGS

FIG. 1c is a perspective view of a shaft for interconnection a gearbox and two pulleys according to the present invention.

FIG. 3a is a perspective view of a leaf spring installed on each beam according to the present invention.

FIG. 3b is a perspective view of the leaf spring of FIG. 3a while the beam having upper extreme position according to the present invention.

FIG. 4a is a perspective view of two leaf springs can be used with or without two weights of FIG. 1a according to the present invention.

FIG. 4b is a perspective view of six leaf springs connecting each beam in FIG. 1a with a system's base according to the present invention.

FIG. 5 is a perspective view of a vise is used as a strainer for each leaf spring and also FIG. 5 showing that each beam of FIG. 1a can take a different shape according to the present invention.

FIG. 8b is a perspective view of a cam shaft in FIG. 8a according to the present invention.

FIG. 9 is a perspective view showing that two gearboxes can be combined with each other by a crankshaft for combination two systems to form one system according to the present invention.

DETAILED DESCRIPTION OF THE INVENTION

Figure 1A:
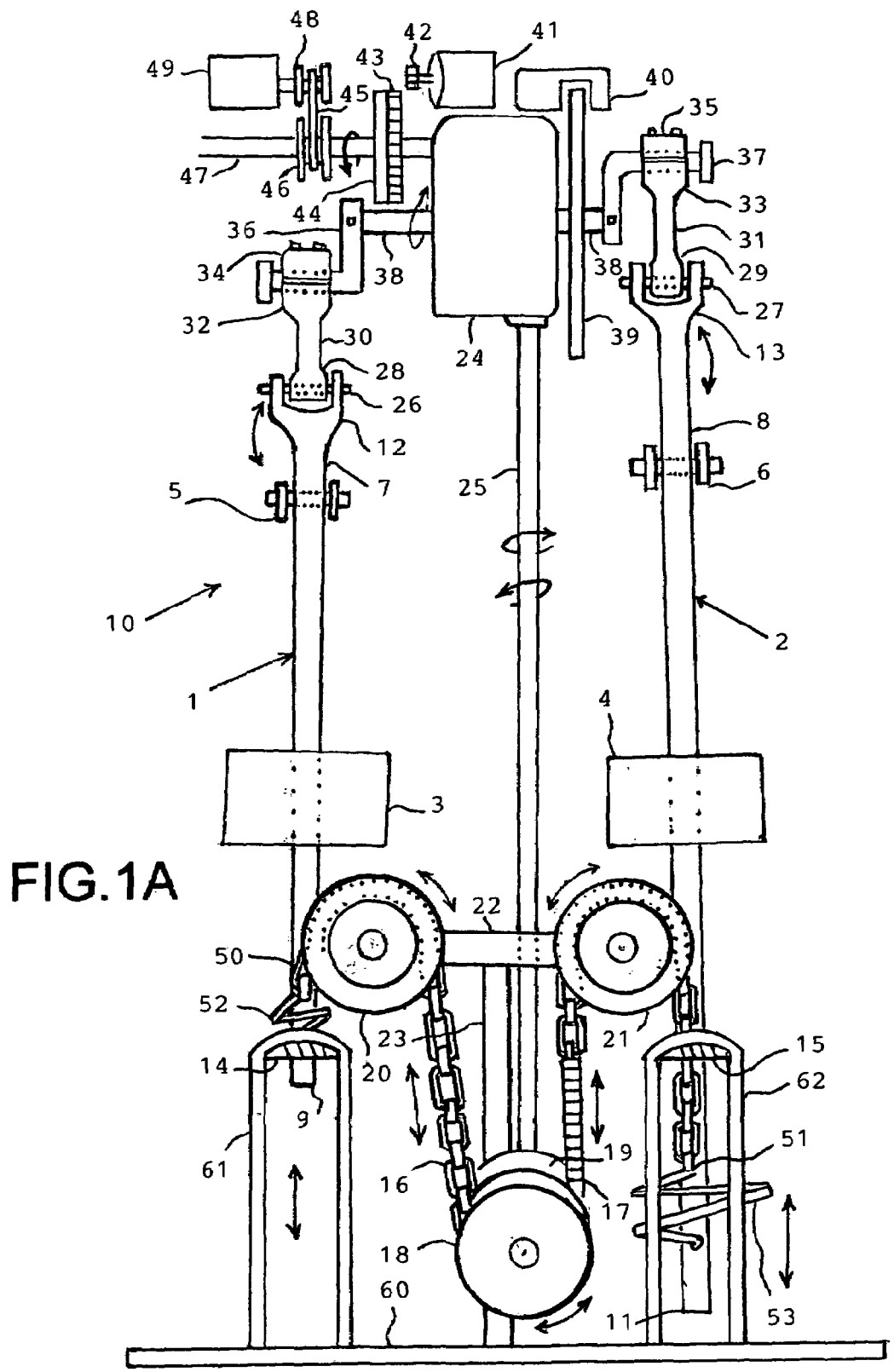
FIG. 1a is a perspective view showing an upper part of a transportation and power generating system of gravity and leaf springs according to the present invention.

Please Refer to FIG. 1a.

Figure 7A:
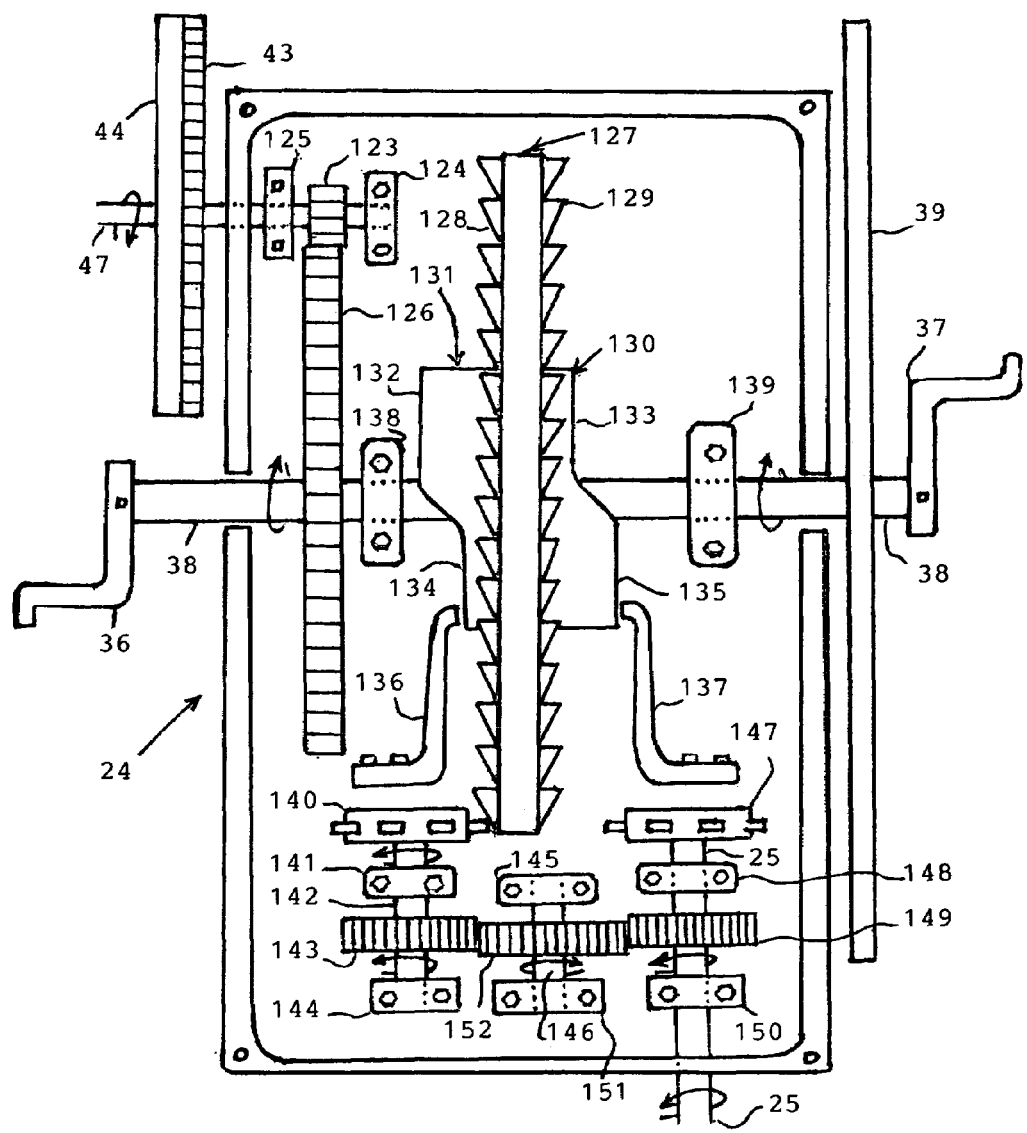
FIG. 7a is an upper perspective view of a first design of a gearbox in FIG. 1a according to the present invention.

FIG. 1a is a perspective diagram showing an upper part of a preferred embodiment for generating kinetic energy by gravity according to the present invention. A transportation and power generating system of gravity and leaf springs 10 includes: two identical beams 1 and 2 for conversion potential energy of two weights 3 and 4 to oscillatory movement can be converted into rotary motion of a crankshaft 38 by two traces 30 and 31; a gearbox 24 is shown in FIG. 7a for regulation oscillatory movement of two beams 1 and 2 through a shaft 25, two pulleys 18 and 19, two chains 16 and 17; an electric starter 41 for starting the system; and a frame 60 for fixing a gearbox 24, a frame 5, a frame 6, a vertical frame 23, a frame 61, a frame 62, and an alternator 49 thereon. Two identical weights 3 and 4. A Y-shaped frame 5 for pivoting the beam 1. A Y-shaped frame 6 for pivoting the beam 2. An end 7 of the beam 1. An end 8 of the beam 2. An end 9 of the beam 1. An end 11 of the beam 2. A Y-shaped part 12 is installed on the end 7 of the beam 1. A Y-shaped part 13 is installed on the end 8 of the beam 2. The beam 1 is pivoted on the Y-shaped frame 5 to be suitable distance between 5 and the system's frame 60. Two ends 9 and 7 of the beam 1 are free to oscillate to up and down. The beam 2 is pivoted on the Y-shaped frame 6 to be suitable distance between the Y-shaped frame 6 and system's frame 60. Two ends 11 and 8 of beam 2 are free to oscillate to up and down. A rectangular frame 61 for protection the end 9. A rectangular frame 62 for protection the end 11. The rectangular frames 61 and 62 are identical. The oscillatory movement of two ends 9 and 11 will be within the limitation of two rectangular frames 61 and 62. The length of two rectangular frames 61 and 62 not more than 40% of the length between the end 9 and the pivot of beam 1 at 5 or the length between the end 11 and the pivot of beam 2 at 6. A bolster 14. A bolster 15. A connecting rod 30 interconnecting the Y-shaped part 12 with the crank 36 for conversion oscillation of the end 7 to rotary motion of the crankshaft 38 that imparts rotary motion to the gearbox 24. A cup 34 for installation the upper end 32 of the connecting rod 30 with the crank 36 of the crankshaft 38. A pin 26 for pivoting a lower end 28 of the connecting rod 30 with the Y-shaped part 12 that is installed on the end 7 of the beam 1. A connecting rod 31 interconnecting the Y-shaped part 13 with the crank 37 of the crankshaft 38 for conversion oscillation of the end 8 of the beam 2 to rotary motion of crankshaft 38 which imparts rotary motion to the gearbox 24. A pin 27 for pivoting the lower end 29 of the connecting rod 31 with the Y-shaped part 13. A cup 35 for Installation the upper end 33 of the connecting rod 31 on the crank 37. A crankshaft 38 is installed in the gearbox 24 for imparting motion of crank 36 and crank 37 to the gearbox 24. The gearbox 24 having an automatic transmission mechanism as FIG. 7a showing for imparting rotary motion from the crankshaft 38 to a shaft 25 and an output shaft 47. The shaft 25 imparts rotary motion to pulleys 19 and 18 that are fixedly secured to an end of the shaft 25. A vertical frame 23 is installed on the system's frame 60 for fixing a horizontal frame 22 thereon. A pulley 21 is free to rotate and it is installed on the right end of the horizontal frame 22 and a chain 17 is trained on the pulley 21. A pulley 20 is installed on the left end of the horizontal frame 22 and the pulley 20 is free to rotate and a chain 16 is trained on the pulley 20. The chain 17 is be fixed on pulley 19 by an end and a second end 51 is fixed on an end of a coil spring 53 and a second end of the coil spring 53 is fixed on the end 11 of the beam 2 and the chain 17 lifts the end 11 to up when the end 9 is descendant. When the shaft 25 rotates to rotary direction thereby the chain 17 coil round the pulley 19 to lift the end 11 to up; on the rotation of the shaft 25 to the opposite rotary direction the chain 17 uncoils to let the end 11 and weight 4 descend. Because, two pulleys 19 and 18 are fixedly secured on the shaft 25, therefore, on the rotation of the pulley 19 to any direction also the pulley 18 is rotating to the same direction for lifting the end 9 to up by the chain 16 that coils round the pulley 18. On the lifting of the end 9 by the chain 16; the coil spring 52 is strained approximately one inch or suitable length when the straining of the chain 16 is equal about three times the weight 3. When the distance between the end 9 and the bolster 14 is one inch or suitable distance and the distance between the end 11 and the system's frame 60 is one inch approximately or suitable distance; the automatic transmission mechanism inside the gearbox 24 changes the rotary direction of the shaft 25 to reverse direction for rotation two pulleys 19 and 18 to opposite direction. The chain 16 is slack and the coil spring 52 is released to let the end 9 descends and the chain 17 coil on the pulley 19 for lifting the end 11 for reversion the movement of beam 1 and beam 2. An end 50 of the chain 16 is connected with the coil spring 52. An end 51 of chain 17 is connected with a coil spring 53. A brake device 40 is installed on the body of the gearbox 24 or on the system's frame 60 and a brake disk 39 that is fixedly secured on the crankshaft 37 for stopping the system. A pinion gear 42 of electric starter 41. A gear 43 is fixedly secured on a flywheel 44. The flywheel 44 is fixedly secured on the output shaft 47. The flywheel 44 has notches or sockets on its circumscription for engagement with a latch installed on the system's frame 60 for keeping the system stopping after the operator used the braking device 40 for stopping the rotation of the crankshaft. A pulley 46 is fixedly mounted on the output shaft 47 for imparting rotary motion of the output shaft 47 to the pulley 48 of an alternator 49 by a belt 45. The alternator 49 for recharging a battery of the electric starter 41.

On the operation, the operator turns the electric starter on for starting the system; the gear 42 engages with the gear 43 for imparting rotary motion to the crankshaft 38 and the shaft 25 through the shaft 47 and gearbox 24 as FIG. 7a showing and the rotary direction of the shaft 25 is according to the position of both two beams. If the end 9 having upper extreme position and the end 11 having lower extreme position; the automatic transmission mechanism inside the gearbox 24 rotates the shaft 25 to rotary direction thereby unwinding the chain 16 off the pulley 18 for descending the end 9. The Y-shaped part 12 oscillates and the connecting rod 30 convert the oscillation of the end 7 to rotary motion of the crankshaft 38 through the crank 36. The chain 17 coils round pulley 19 for lifting the end 11 of beam 2. The connecting rod 31 imparts the oscillation of the end 8 to crank 37 for rotation the crankshaft 38; because, the winding speed of the chain 17 round the pulley 19 is faster than the speed of the end 11 to up, therefore, the spring 53 is strained when the straining of the chain 17 is equal to three times the weight 4. The automatic transmission mechanism inside the gearbox 24 changes rotary direction of the shaft 25 into opposite rotary direction when the distance between the lifted end 11 and bolster 15 is one inch approximately or suitable distance and the distance between the end 9 and the system's frame 60 is one inch approximately or suitable distance. The chain 16 coils round pulley 18 for lifting the end 9 from down to up and chain 17 unwind off pulley 19 for descent the end 11. The oscillatory movement of the two beams is continuous on the operation of the system.

The connecting rod 30 this for convenience may also be referred to as a first connecting rod.

The connecting rod 31 this for convenience may also be referred to as a second connecting rod.

The crank 36 this for convenience may also be referred to as a first crank.

The crank 37 this for convenience may also be referred to as a second crank.

The beam 1 this for convenience may also be referred to as a first beam.

The beam 2 this for convenience may also be referred to as a second beam.

The end 7 this for convenience may also be referred to as a first short end.

The end 8 this for convenience may also be referred to as a second short end.

The Y-shaped frame 5 this for convenience may also be referred to as a first Y-shaped frame.

The Y-shaped frame 6 this for convenience may also be referred to as a second Y-shaped frame.

The weight 3 this for convenience may also be referred to as a first weight.

The weight 4 this for convenience may also be referred to as a second weight.

The pulley 20 this for convenience may also be referred to as a first pulley.

The pulley 21 this for convenience may also be referred to as a second pulley.

The pulley 19 this for convenience may also be referred to as a third pulley.

The pulley 18 this for convenience may also be referred to as a fourth pulley.

The coil spring 52 this for convenience may also be referred to as a first coil spring.

The coil spring 53 this for convenience may also be referred to as a second coil spring.

The rectangular frame 61 this for convenience may also be referred to as a first rectangular frame.

The rectangular frame 62 this for convenience may also be referred to as a second rectangular frame.

The end 9 this for convenience may also be referred to as a first long end.

The end 11 this for convenience may also be referred to as a second long end.

The chain 16 this for convenience may also be referred to as a first chain.

The chain 17 this for convenience may also be referred to as a second chain.

Figure 1B:
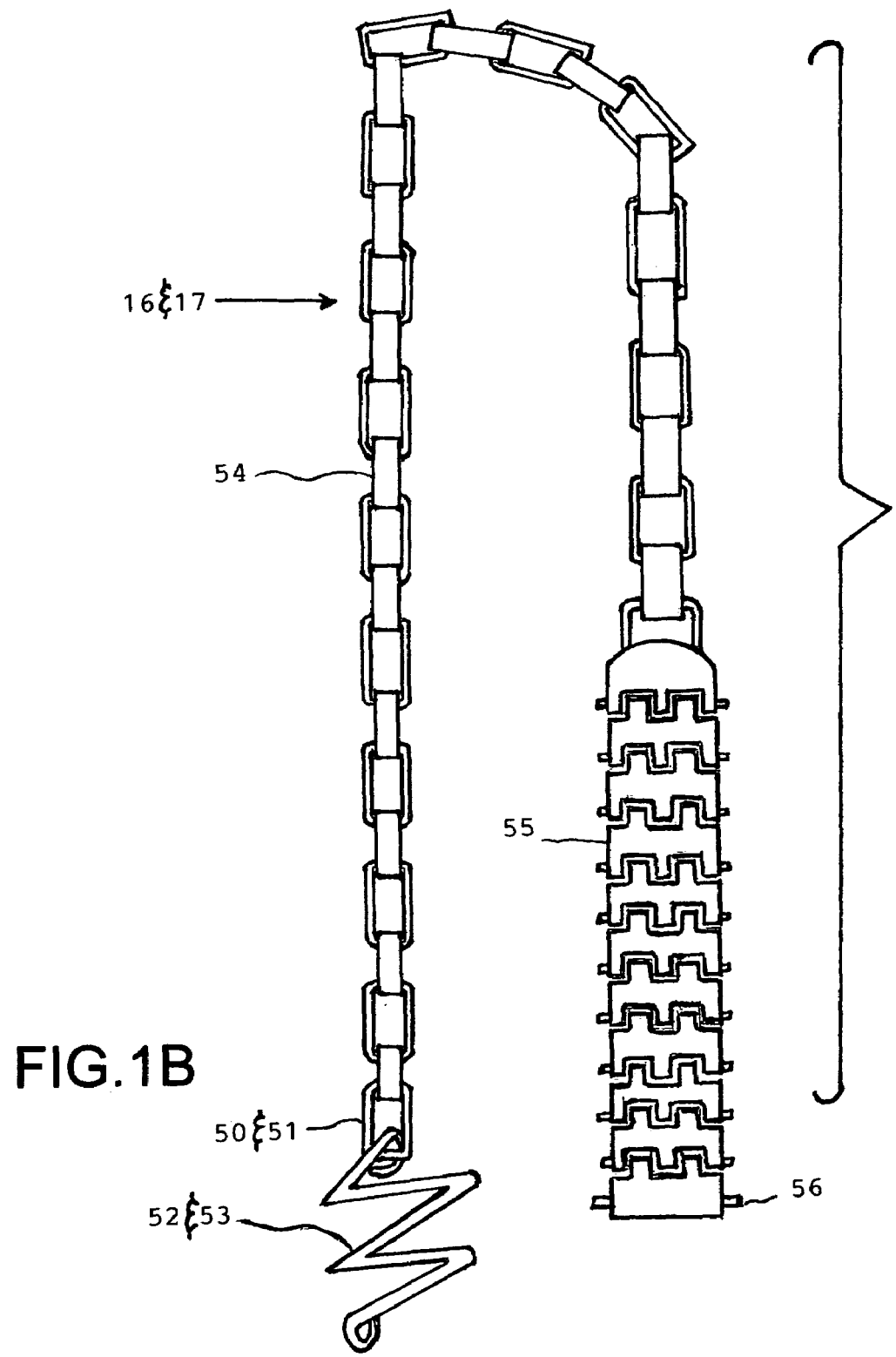
FIG. 1b is a perspective view of two identical chains in FIG. 1a according to the present invention.

Please Refer to FIG. 1*b*

FIG. 1*b* is a perspective view of two identical chains 16 and 17 of FIG. 1*a* according to the present invention. Each chain consists of two parts 54 and 55. A part 55 having a big width for winding on the pulley 18 or 19. A pin 56 for fixing the part 55 on the pulley 18 or 19. A part 54 is trained on the pulley 20 or 21. The free end 51 of the chain 17 is connected with the coil spring 53 and the free end 50 of the chain 16 is connected with the coil spring 52.

Please Refer to FIG. 1*c* and FIG. 1*a*.

FIG. 1*c* is a perspective view of a shaft for interconnection a gearbox with two pulleys according to the present invention. A shaft bearing 57 for installation the shaft 25 on the vertical frame 23. Two gears 149 and 147 are fixedly secured on an end of the shaft 25 for imparting rotary motion of the gearbox 24 to pulleys 18 and 19 through the shaft 25 and both two gears 149 and 147 are shown in FIG. 7*a*.

Figure 1D:
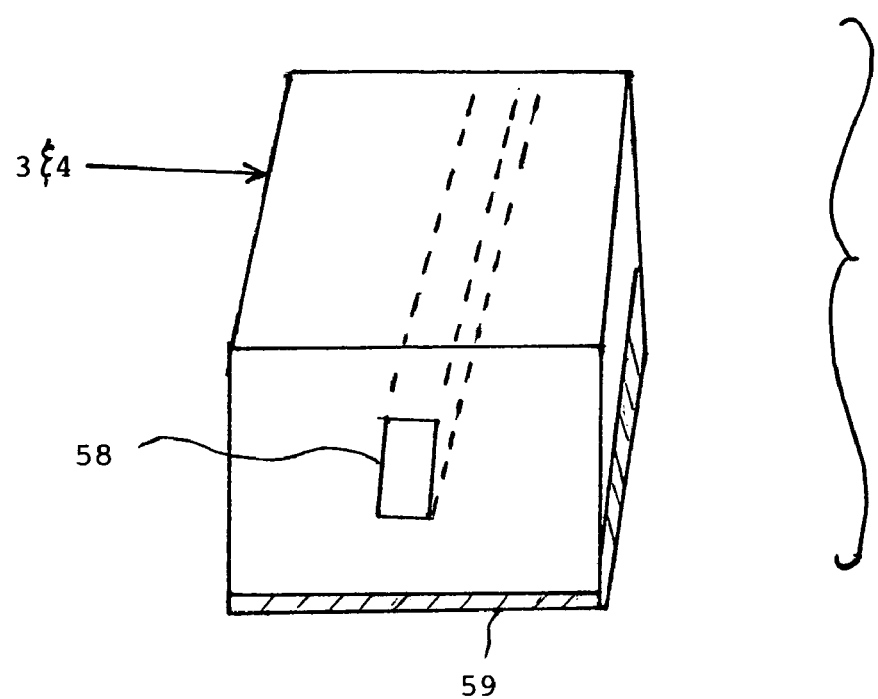
FIG. 1d is a perspective view of each weight according to the present invention.

Please Refer to FIG. 1*d* and FIG. 1*a*.

FIG. 1*d* is a perspective view of each weight according to the present invention. A longitudinal hole 58 for installation the weight 3 to the beam 1 and the weight 4 to the beam 2. A bolster 59 is fixedly secured to the down surface of each weight.

Figure 2A:
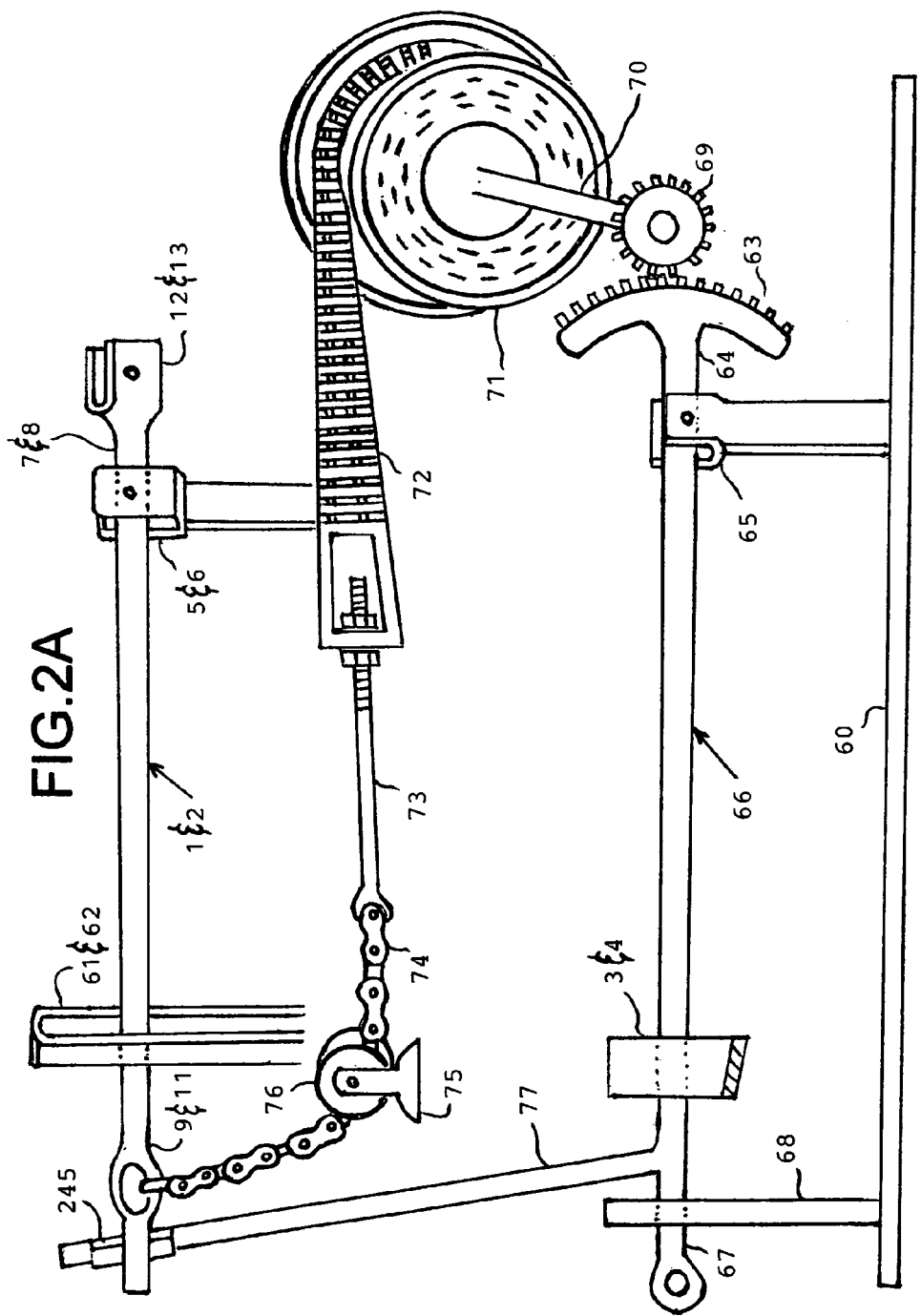
FIG. 2a is a perspective view of an additional beam is being interconnected with an essential beam by a transfer linkage according to the present invention

Please Refer to FIG. 2*a*.

FIG. 2*a* is a perspective view of an additional beam is interconnected with each beam of FIG. 1*a* by a mechanical linkage according to the present invention. An additional beam 66 can be mounted with the beam 1 and the beam 2 in the system of FIG. 1*a* for increasing the System's output. May also be more than one additional beam can be used with beams 1 and 2. Two beams 1 and 2 have the same number of additional beams for stabilizing output of the system 10. The weight 3 or 4 is mounted on the additional beam 66 instead of the beam 1 or 2. A Y-shaped frame 65 for installation the beam 66 by a pivot. An end 67 of the beam 66. An end 64 of the beam 66. A semicircular post with notches 63 is mounted on the end 64 of the beam 66 and notches 63 are engaged with a gear 69 for imparting oscillatory movement of the beam 66 to a pulley 71 through a shaft 70. The shaft 70 will be installed on the system's base 60 by a shaft bearing. The pulley 71 is fixedly secured on the shaft 70. The gear 69 is fixedly secured on the shaft 70. A chain 72 is mounted on the pulley 71 by an end and a second end of the chain 72 is fixed on the end of a connecting piece 73 by a turnbuckle. A chain 74 is fixed on an end of the connecting piece 73 and a second end of the chain 74 is fixed on the end 9 of the beam 1 or the end 11 of the beam 2. The chain 74 is trained on a pulley 76 that is mounted on frame 75 that is fixed on the System's frame 60. An arm 77 is fixed on the end 67 and its free end is touched with under surface of the ends 9 or 11 and a bolster 245 is fixedly secured on the free end of the arm 77. When the end 67 descends with the weight 3 or the weight 4; the notches 63 imparts oscillatory movement to the gear 69 to rotate the shaft 70 that rotate the pulley 71 to train the chain 72 that coil round the pulley 71 for descent the end 9 or 11. When the end 67 is lifting by the chain 16 or 17; oscillatory movement of the rack 63 rotates the gear 69 to reverse rotary direction; the shaft 70 and the pulley 71 rotate to reverse rotary direction; the chain 72 unwinds to let the end 9 or 11 is be lifted by the arm 77.

The pulley 71 this for convenience may also be referred to as a first pulley.

The pulley 76 this for convenience may also be referred to as a second pulley.

The rack 63 this for convenience may also be referred to as a first rack.

The gear 69 this for convenience may also be referred to as a second gear.

The Y-shaped frame 5 or 6 this for convenience may also be referred to as a first Y-shaped frame.

The Y-shaped frame 65 this for convenience may also be referred to as a second Y-shaped frame.

Figure 2B:
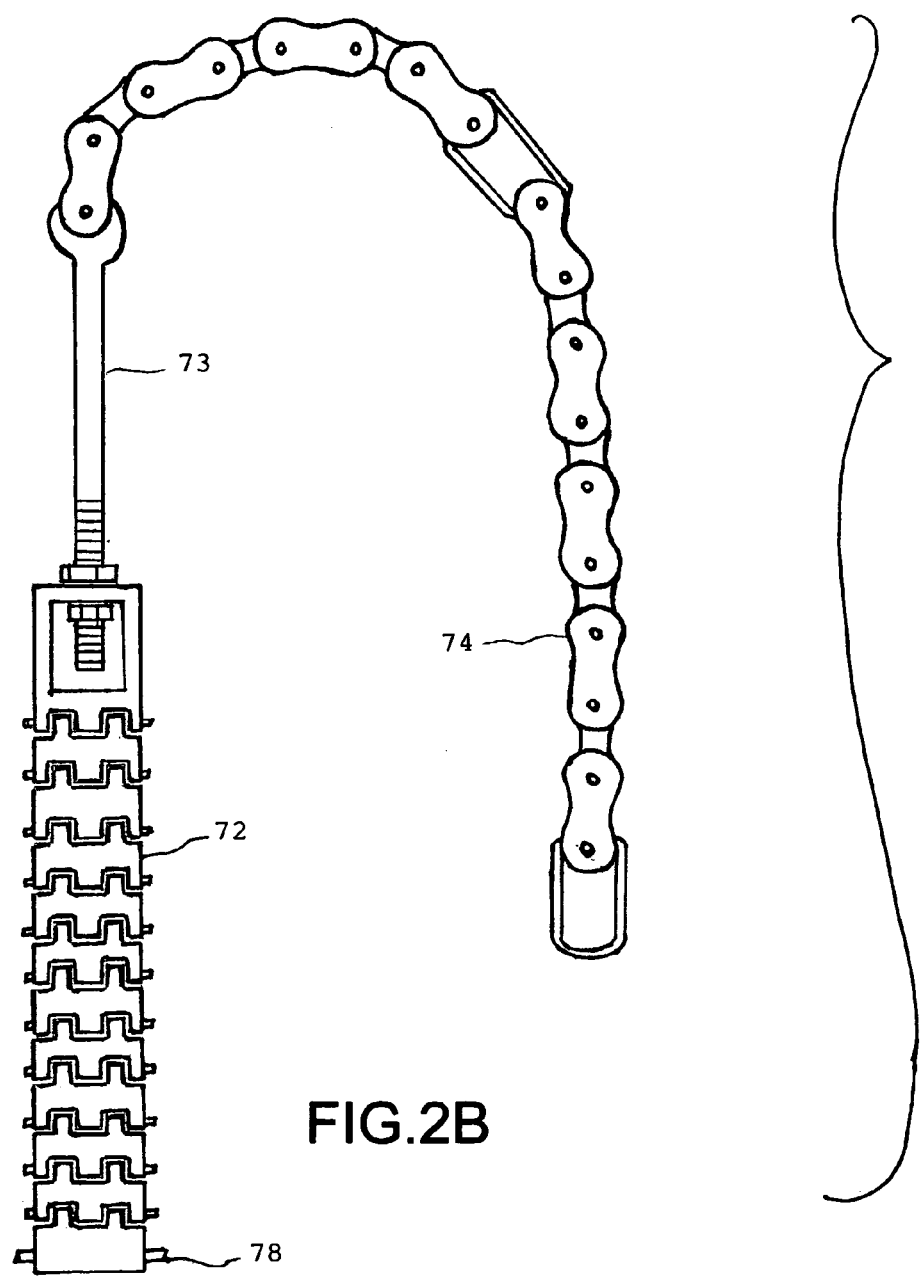
FIG. 2b is a perspective view of a transfer linkage among an essential beam and an additional beam according to the present invention.

Please Refer to FIG. 2*b* and FIG. 2*a*.

FIG. 2*b* is a perspective view of a transfer linkage for interconnection among an essential beam and an additional beam according to the present invention. A pin 78 for fixing an end of the chain 72 to the pulley 71. The connecting piece 73 having a turnbuckle for installation an end of the connecting piece 73 with the chain 72.

A second end of the connecting piece 73 is connected with the chain 74. The chain 72 having a big width.

Please Refer to FIG. 3*a* and FIG. 3*b*.

FIG. 3*a* is a perspective view of a leaf spring installed on each beam according to the present invention. A leaf spring 80 is fixed on the beams 1 and 2 by an end and a second end of the leaf spring 80 is fixed to the Y-shaped frame 5 or 6 for descending the end 9 of the beam 1 or the end 11 of the beam 2. A U-shaped link 79 is fixed on the beam 1 or the beam 2 by bolts for installation an end of the leaf spring 80 on beam 1 or 2. A U-shaped link 81 is fixed on the Y-shaped frame 5 or 6 by bolts for installation the second end of the leaf spring 80 on the Y-shaped frame 5 or 6.

FIG. 3*b* is a perspective view of the leaf spring of FIG. 3*a* while the beam having an upper extreme position according to the present invention.

Please Refer to FIG. 4a.

FIG. 4a is a perspective view of two leaf springs can be used with or without the two weights of FIG. 1a according to the present invention. Two leaf springs 83 and 86 are strained and connected with each other. Two rings 84 and 85 for fixing two ends of leaf springs 83 and 86 with each other. A ring 82 for connection the leaf spring 83 with the end 9 of the beam 1 or the end 11 of the beam 2 of FIG. 1a. A ring 87 for connection the leaf spring 86 with the system's frame 60 of FIG. 1a. Two leaf springs 83 and 86 are used for descent the end 9 of beam 1 and the end 11 of beam 2 with or without using two weights 3 and 4 of FIG. 1a.

Please Refer to FIG. 4b.

FIG. 4b is a perspective view of six leaf springs connecting each beam in FIG. 1a with a system's base according to the present invention. Any number of leaf springs can be used for each beam for descent the end 9 or 11 in FIG. 1a. A leaf spring 89 is connected with the end 9 or 11 by a ring 88. Two ends of the leaf spring 89 and a leaf spring 92 are connected with each other by two rings. The leaf spring 92 and a leaf spring 90 are connected with each other at their middle by a ring. Two ends of the leaf spring 90 and a leaf spring 93 are connected with each other by two rings. The leaf spring 93 is connected with a leaf spring 91 by a ring at their middle. Two ends of two leaf springs 91 and 94 are connected with each other by two rings. A leaf spring 94 is connected at its middle with the system's frame 60 by a ring.

Please Refer to FIG. 5.

FIG. 5 is a perspective view of a vise is used as a strainer for each leaf spring and also FIG. 5 showing that each beam of FIG. 1a can take a different shape according to the present invention. An assemblage of four leaves 247. An assemblage of four leaves 246. A flexible cable 103 is trained on a pulley 106. The cable 103 for connection a leaf spring 86 with the end 9 of the beam 1. The pulley 106 is installed on the frame 60 and it's free to rotate. A leaf spring 83 is connected with a link 99 by a flexible cable 102. The link 99 is fixed on a movable part 98 of a vise 95. The vise 95 for straining the leaves 247 and 246. A leaf spring 86 is connected with the end 11 of beam 2 by a flexible cable 104. The flexible cable 104 is trained on a pulley 105. The pulley 105 is installed on the frame 60 and it's free to rotate. A leaf spring 83 is connected with a link 100 by a flexible cable 101. The link 100 is fixed on the movable part 98 of the vise 95. An arm 96 for moving the movable part 98 of the vise 95.

The weight 3 this for convenience may also be referred to as a first weight.

The weight 4 this for convenience may also be referred to as a second weight.

The beam 1 this for convenience may also be referred to as a first beam.

The beam 2 this for convenience may also be referred to as a second beam.

The flexible cable 103 this for convenience may also be referred to as a first flexible cable.

The flexible cable 102 this for convenience may also be referred to as a second flexible cable.

The flexible cable 104 this for convenience may also be referred to as a third flexible cable.

The flexible cable 101 this for convenience may also be referred to as a fourth flexible cable.

The pulley 106 this for convenience may also be referred to as a first pulley.

The pulley 105 this for convenience may also be referred to as a second pulley.

The assemblage of the leaves 247 this for convenience may also be referred to as a first assemblage of the leaves.

The assemblage of the leaves 246 this for convenience may also be referred to as a second assemblage of the leaves.

The link 99 this for convenience may also be referred to as a first link.

The link 100 this for convenience may also be referred to as a second link.

Figure 6:
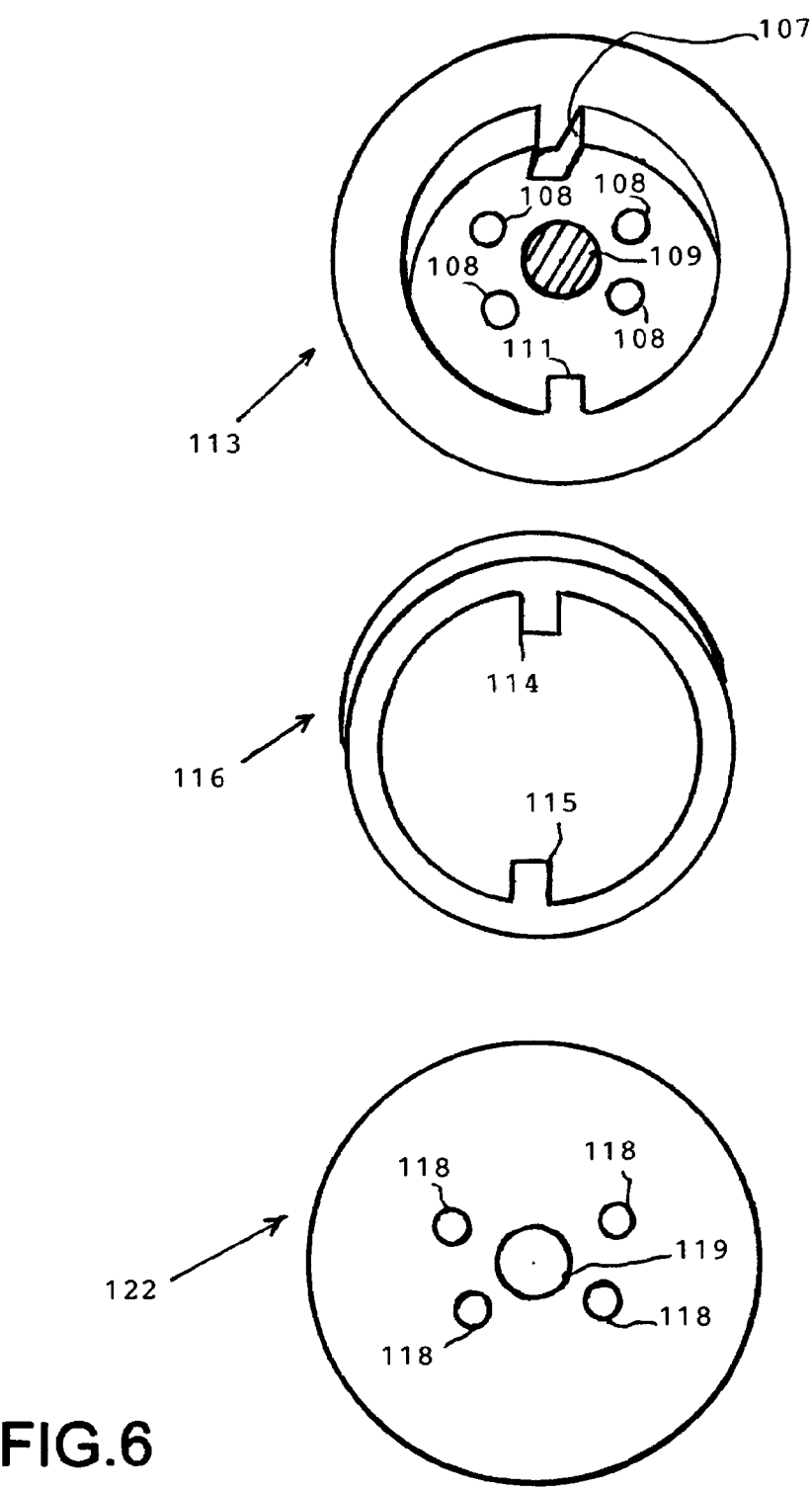
FIG. 6 is a perspective view of three parts of two pulleys in FIG. 1a according to the present invention.

Please Refer to FIG. 6.

FIG. 6 is a perspective view of three parts of two pulleys in FIG. 1a according to the present invention. Two pulleys 20 and 21 in FIG. 1a each one of them consists of three parts. A first part 113 having an end plate or flange and two sockets 107 and 111. A shaft 109 for installation the first part 113 on the horizontal frame 22 in FIG. 1a. Four hales 108 for installation the first part 113 with a third part 122 by bolts. A second part 116 is a pulley made of rubber or suitable material for prevention noise when the system is running. Two notches 114 and 115 for engagement with two sockets 107 and 111 of the first part for installation the second part 116 on the first part 113. The third part 122 is an end plate or flange having a hole 119 for installation the third part 122 on the axle 109. Four holes 118 for installation the third part 122 on the first part 113 by bolts.

The first part 113 this for convenience may also be referred to as a first pulley component.

The second part 116 this for convenience may also be referred to as a second pulley component.

The third part 122 this for convenience may also be referred to as a third pulley component.

Please Refer to FIG. 7a, FIG. 1a, FIG. 7b, and FIG. 7c.

Figure 7B:
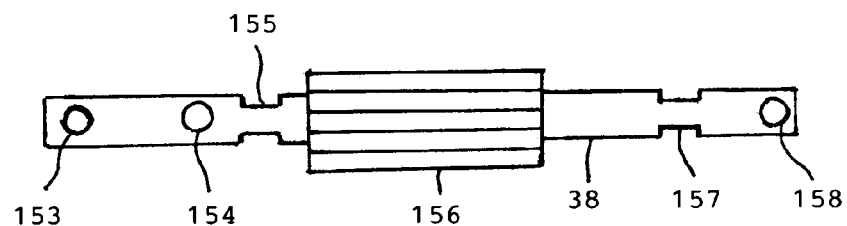
FIG. 7b is a perspective view of a part of a crankshaft in the gearbox of FIG. 7a according to the present invention.

FIG. 7a is an upper perspective view of a first design of a gearbox in FIG. 1a according to the present invention. A gearbox 24 is fixedly secured on the frame 60 in FIG. 1a for regulation the oscillatory movement of two beams 1 and 2. A crank 36 and a crank 37 are fixedly secured on a crankshaft 38 for conversion oscillatory movement of two ends 7 and 8 of beams 1 and 2 to rotary motion of the crankshaft 38. A rectilinear angle between a crank arm of the crank 36 and a crank arm of the crank 37. The crankshaft 38 is installed in the gearbox 24 by two shaft bearings 138 and 139. A cogged wheel 127 has a gear 129 on its right surface and a gear 128 on its left surface. The crankshaft 38 having a gear 156 is shown in FIG. 7b to mesh with a gear 159 of the cogged wheel 127 in FIG. 7c. The cogged wheel 127 rotates by the crankshaft 38 and also the cogged wheel 127 is axially slidable to the right or left on the gear 156 of the crankshaft 38 as FIG. 7b showing. A drum 130 is fixedly secured on the right surface of the cogged wheel 127 by its flat end and its external edge having 50% approximately a low edge 133 and 50% approximately a high edge 135. The external edge of the drum 130 is contacting an upper end of a frame 137 that pushes the high edge 135 of the drum 130 on the rotation of the crankshaft 38; the cogged wheel 127 is free to slide to the left on the gear 156 of FIG. 7b for meshing the gear 128 with a gear 140 for imparting rotary motion of the gear 128 to the gear 140. A drum 131 is fixedly secured on the left surface of the cogged wheel 127 by its flat end and its second external edge having 50% approximately a low edge 134 and 50% approximately a high edge 132. The external edge of the drum 131 is contacting an upper end of a frame 136 that pushes the high edge 132 when the crankshaft 38 is rotating; the cogged wheel 127 is free to slide to the right on the crankshaft 38 for disengagement the gear 128 off the gear 140, at the same time, engagement the gear 129 with a gear 147 for imparting rotary motion to the gear 147. A frame 136 is fixedly secured by a lower end on the bottom of the gearbox 24 and an upper end of the frame 136 is bent towards the external edge of the drum 131. The frame 136 acts as a leaf spring; on happening a difficulty on engagement the gear 128 and the gear 140; the frame 136 slant to the left to avoid breakage the cogs of two gears 129 and 147. The external low edges 133 and 134 must be opposite to each other on fixation the two drums. The ramp between the low edge and the high edge of each drum must touch the frame 136 or the frame 137 before any crankpin reaches to upper extreme position or lower extreme position, because, the shaft 25 changes direction its rotation before the descendant weight 3 or 4 reach to lower extreme position with approximately one inch or suitable distance. A gear 126 is fixedly secured on the crankshaft 38. The gear 126 is meshed with a gear 123 for imparting rotary motion to an output shaft 47 with faster rotational speed. The output shaft 47 having two shaft bearings 125 and 124. The gear 123 is fixedly secured on the output shaft 47 for imparting rotary motion of the crankshaft 38 through the gear 126. A flywheel 44 is fixedly secured on the output shaft 47. A gear 43 is installed on the flywheel 44 for imparting rotary motion of the pinion gear 42 of the electric starter 41. A shaft 142 is installed by two shaft bearings 141 and 144. A gear 140 is fixedly secured on the shaft 142. The gear 140 engages with the gear 128 on contacting the frame 137 with the high edge 135 of the drum 130; the cogged wheel 127 is slid to the left for engagement the gear 128 and the gear 140 for imparting rotary motion of the crankshaft 38 to the shaft 25 through the gear 128, the shaft 142, a gear 143, a gear 152, and a gear 149. The reverse idler gear 152 is fixedly secured on a shaft 146. The shaft 146 is installed by two shaft bearings 145 and 151. The gear 152 is engaged with gears 143 and 149 for imparting rotary motion of the gear 143 to the shaft 25 through the gear 149. The shaft 25 is installed by two shaft bearings 148 and 150. A gear 147 is fixedly secured on an end of the shaft 25 for imparting rotary motion of the crankshaft 38 through the gear 129 on engagement the gear 129 with the gear 147 when the frame 137 is contacting with the low edge 133 and the frame 136 is contacting with the high edge 132 while the system is running. Gears 128, 129, 140, and 147 their teeth like the teeth of a ratchet gear. The brake disk 39 and the braking device 40 for stop the system.

The gear 43 this for convenience may also be referred to as a first gear.

The gear 123 this for convenience may also be referred to as a second gear.

The cogged wheel 127 this for convenience may also be referred to as a third cogged wheel.

The gear 128 this for convenience may also be referred to as a fourth gear.

The gear 129 this for convenience may also be referred to as a fifth gear.

The gear 126 this for convenience may also be referred to as a sixth gear.

The gear 140 this for convenience may also be referred to as a seventh gear.

The gear 143 this for convenience may also be referred to as a eighth gear.

The gear 152 this for convenience may also be referred to as a ninth gear.

The gear 149 this for convenience may also be referred to as a tenth gear.

The gear 147 this for convenience may also be referred to as a eleventh gear.

The shaft 47 this for convenience may also be referred to as a first shaft.

The shaft 142 this for convenience may also be referred to as a second shaft.

The shaft 146 this for convenience may also be referred to as a third shaft.

The shaft 25 this for convenience may also be referred to as a fourth shaft.

The drum 131 this for convenience may also be referred to as a first drum.

The drum 130 this for convenience may also be referred to as a second drum.

The frame 136 this for convenience may also be referred to as a first frame.

The frame 137 this for convenience may also be referred to as a second frame.

Figure 7C:
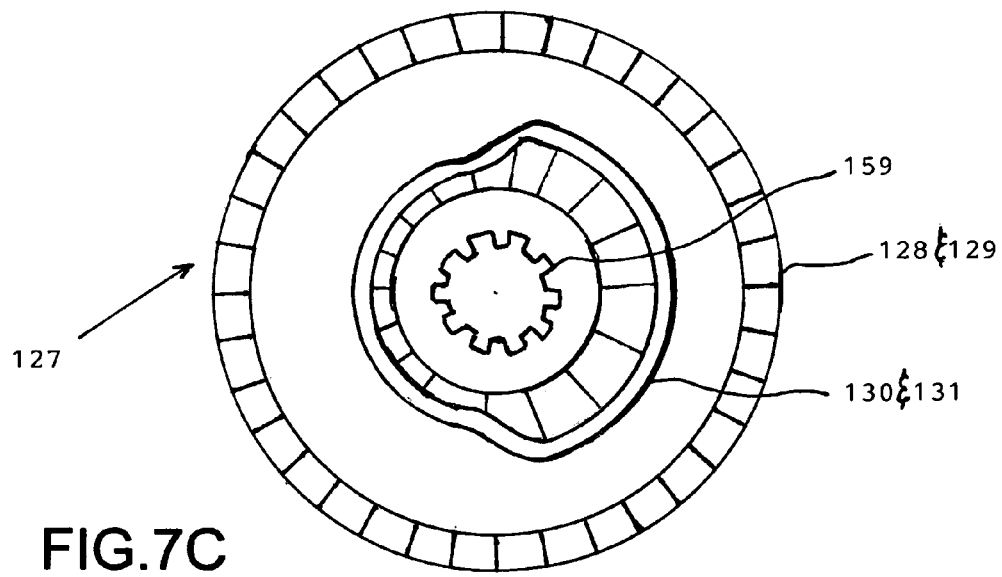
FIG. 7c is a perspective view of a gear in a gearbox of FIG. 7a according to the present invention.

Please Refer to FIG. 7b, FIG. 7c and FIG. 7a.

FIG. 7b is a perspective view of a part of a crankshaft in the gearbox of FIG. 7a according to the present invention. A gear 156 is fixedly secured on the crankshaft 38. On installation the cogged wheel 127 on the crankshaft 38; a gear 159 of the cogged wheel 127 that is shown in FIG. 7c engages with the gear 156. The cogged wheel 127 rotates on the rotation of the crankshaft 38; the cogged wheel 127 is free to slide to both two directions by two drums 130 and 131 and two frames 136 and 137. Two crankshaft journals 155 and 157 for installation the crankshaft 38 on two shaft bearings 138 and 139 in the gearbox 24. A socket 153 for installation the crank 36 to the crankshaft 38 by a pin. A socket 154 for installation the gear 126 on the crankshaft 38 by a pin. A socket 158 for installation the crank 37 by a pin.

The gear 156 this for convenience may also be referred to as a twelfth gear.

Please Refer to FIG. 7c and FIG. 7a.

FIG. 7c is a perspective view of the cogged wheel 127 in FIG. 7a. The gear 159 for installation the cogged wheel 127 on the gear 156 of the crankshaft 38.

The gear 159 this for convenience may also be referred to as a thirteenth gear.

Figure 8A:
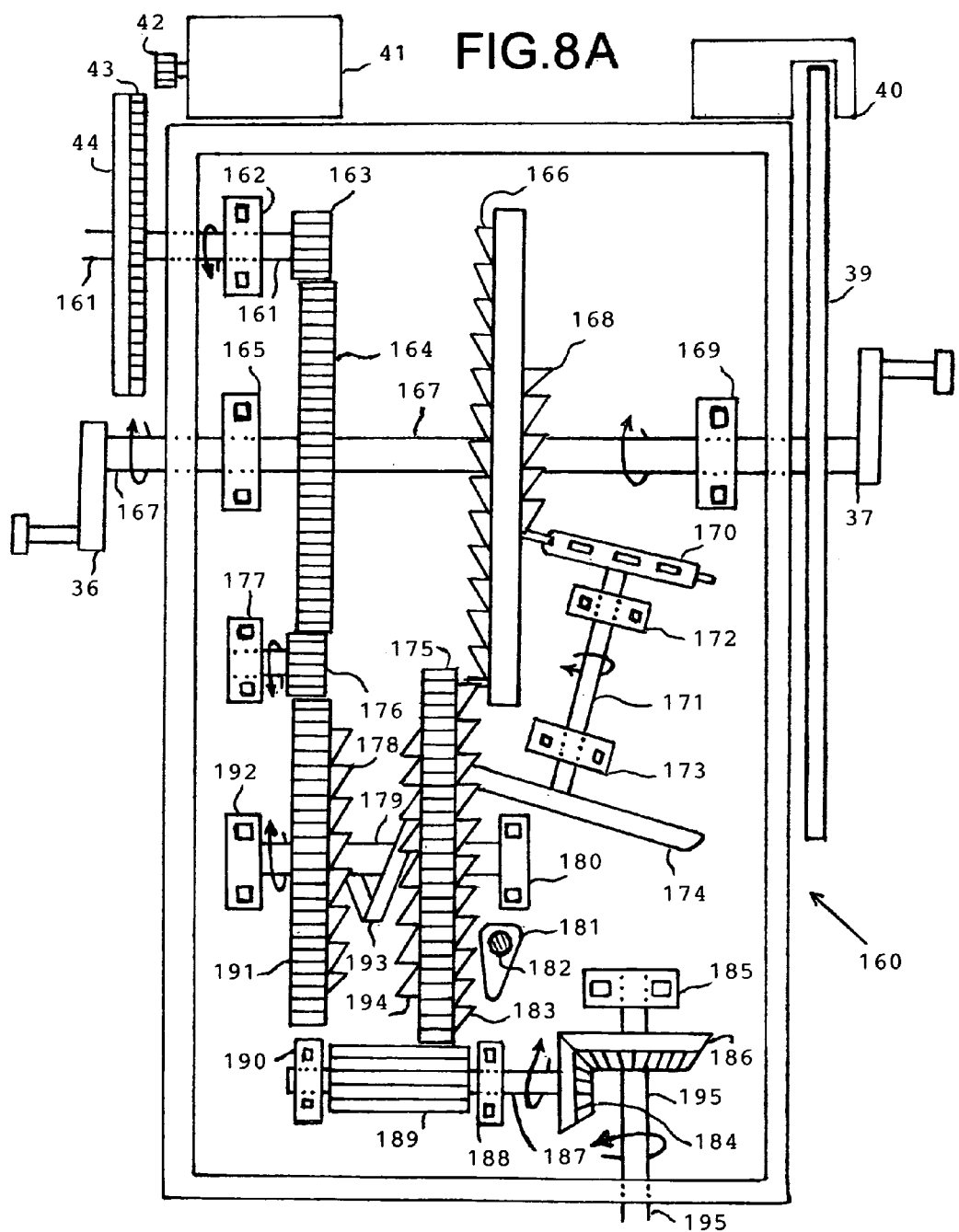
FIG. 8a is a perspective view of a second design of a gearbox in FIG. 1a according to the present invention.

Please Refer to FIG. 8a and FIG. 1a.

FIG. 8a is an upper perspective view of a second design of a gearbox in FIG. 1a according to the present invention. A gearbox 160 can be used instead of the gearbox 24 in FIG. 1a for regulation the oscillation of two beams 1 and 2. A crankshaft 167 having two cranks 36 and 37 for conversion the oscillation of the two ends 7 and 8 of two beams 1 and 2 to rotary motion of the crankshaft 167. A crank 37 is installed on the right end of the crankshaft 167. The crank 37 will interconnect with the upper end 33 of connecting rod 31 in FIG. 1a and a crank 36 will interconnect with the upper end 32 of connecting rod 30. A rectilinear angle between a crank arm of the crank 36 and a crank arm of the crank 37. A shaft 195 is installed in shaft bearing 185 for imparting rotary motion to two pulleys 18 and 19 that will secured to an external end of the shaft 195 instead of the shaft 25 of FIG. 1a. The crankshaft 167 is installed by two shaft bearings 165 and 169. A gear 166 is fixedly secured on the crankshaft 167. The gear 166 engages with a gear 183 when a low edge of a cam 174 is contacting with the right surface of a gear 175. A gear 168 is fixedly secured on the right surface of the gear 166. The gear 168 is engaged with a gear 170 of a cam shaft 171 for imparting rotary motion of the crankshaft 167 to a cam 174 that rotates a half revolution on the rotation of the crankshaft 167 a half revolution, because, the gear 168 and gear 170 are identical. A cam 174 having a projection about 50% of its edge and a second half of its edge is a low edge approximately. The cam 174 is contacting the right surface of a gear 175. A cam shaft 171 is installed in gearbox 160 by two shaft bearings 172 and 173 on an H-shaped frame are shown in FIG. 8b. A gear 164 is fixedly secured on the crankshaft 167. The gear 164 is engaged with a gear 163 for imparting rotary motion of the crankshaft 167 to an output shaft 161; the gear 163 increases the rotational speed of the shaft 161. A shaft bearing 162 for installation the output shaft 161 in gearbox 160. A flywheel 44 is installed on the output shaft 161. A gear 43 is installed on the flywheel 44 for imparting rotary motion of an electric starter 41 through a pinion gear 42 to start the system's work. A reverse idler gear 176 is engaged with gear 164 and a gear 191. A shaft bearing 177 for installation a shaft of the gear 176. A shaft 179 has two shaft bearings 192 and 180. A gear 191 is fixedly secured on the shaft 179 and engaged with the reverse idler gear 176. A gear 178 is installed on the right surface of the gear 191. A gear 175 can be slid axially on the shaft 179 by the projection of the cam 174 and force of a coil spring 193; the gear 175 is engaged with a gear 189. A gear 194 is fixedly secured on the left surface of the gear 175. A gear 183 is fixedly secured on the right surface of the gear 175. A coil spring 193 is installed on shaft 179 by two end plates are shown in FIGS. 8d and 8e for sliding the gear 175 to the right on shaft 179 when the low edge of the cam 174 is contacting the right surface of the gear 175. A gear 189 is installed on a shaft 187 and meshed with the gear 175. A gear 189 having a big width for prevention disengagement the gear 175 and the gear 189 on sliding the gear 175 to the right or left on its shaft. When the gear 175 rotates a half revolution cause revolution of the gear 189 several times. A shaft 187 has two shaft bearings 188 and 190. A bevel gear 184 is installed on an end of the shaft 187. The bevel gear 184 is engaged with a bevel gear 186. The bevel gear 186 is fixedly secured on the shaft 195. A cam 181 is fixed on a cam shaft 182 that having a shaft bearing to the gearbox's bottom for installation its lower end and its upper end having a shaft bearing in an upper cover of the gearbox as FIG. 8f showing. A brake disk 39 and braking device 40 for stopping the system. Gears 166, 178, 194, and 183 their teeth are like the teeth of a ratchet gear. On operation the system, a first step, the operator does to start the system's work is turning the electric starter 41 on; the gear 42 engages with the gear 43 for imparting rotary motion of the electric starter 41 to the crankshaft 167 through the shaft 161, the gear 163, and the gear 164. The gears that are used for imparting rotary motion of the crankshaft 167 to the shaft 195 are different according to the position of the crank 36, crank 37, end 9 of beam 1, and end 11 of beam 2; if their position as FIG. 1a showing that the end 9 is still lifting to up and end 11 is still descending to down; the low edge of the cam 174 is contacted the right surface of the gear 175, therefore, the coil spring 193 is pushing the gear 175 to slide to the right for engagement the gear 183 and the gear 166 for imparting rotary motion of the crankshaft 167 to the shaft 195 through the gear 166, the gear 183, the gear 175, the gear 189, the shaft 187, the gear 184, and the gear 186 for rotation the shaft 195 to the same rotary direction as FIG. 8a showing. The pulley 18 rotates and the chain 16 coil round the pulley 18 for lifting the end 9; the chain 17 uncoils off the pulley 19 for descent the end 11. Before the end 9 reaches to upper extreme position and the end 11 reach to lower extreme position with approximately one inch or suitable distance must be the projection of the cam 174 contacted the right surface of the gear 175 for pushing the gear 175 to slide on the shaft 179 to the left for disengagement the gear 183 and gear 166, at the same time, engagement the gear 178 and the gear 194 for imparting rotary motion of the crankshaft 167 to the shaft 195 through the gear 164, the reverse idler gear 176, the gear 191, the gear 178, the gear 194, the gear 175, the gear 189, the shaft 187, the gear 184, and the gear 186 for rotation the shaft 195 to reverse rotary direction. The chain 17 coils round the pulley 19 for lifting the end 11; the chain 16 uncoils off the pulley 18 for descent the end 9. The oscillatory movement of the two beams 1 and 2 is continuous when the system is operating. The operator must turn the electric starter 41 off after the system is started. The operator can stop the system by using the brake device 40; the operator rotates the cam 181 a quarter revolution by using an arm is connected with the cam shaft 182 as FIG. 8f showing; a projection of the cam 181 pushes the gear 175 to slide to the left against the force of the coil spring 193 to prevent the gear 183 engage with the gear 166 for stopping the system.

The output shaft 161 this for convenience may also be referred to as a first shaft.

The shaft 179 this for convenience may also be referred to as a second shaft.

The shaft 187 this for convenience may also be referred to as a third shaft.

The shaft 195 this for convenience may also be referred to as a fourth shaft.

The cam shaft 171 this for convenience may also be referred to as a first cam shaft.

The cam shaft 182 this for convenience may also be referred to as a second cam shaft.

The gear 43 this for convenience may also be referred to as a first gear.

The gear 163 this for convenience may also be referred to as a second gear.

The gear 164 this for convenience may also be referred to as a third gear.

The gear 166 this for convenience may also be referred to as a fourth gear.

The gear 168 this for convenience may also be referred to as a fifth gear.

The gear 170 this for convenience may also be referred to as a sixth gear.

The reverse idler gear 176 this for convenience may also be referred to as a seventh gear.

The gear 191 this for convenience may also be referred to as a eighth gear.

The gear 178 this for convenience may also be referred to as a ninth gear.

The gear 194 this for convenience may also be referred to as a tenth gear.

The gear 175 this for convenience may also be referred to as an eleventh gear.

The gear 183 this for convenience may also be referred to as a twelfth gear.

The gear 189 this for convenience may also be referred to as a thirteenth gear.

The gear 184 this for convenience may also be referred to as a fourteenth gear.

The gear 186 this for convenience may also be referred to as a fifteenth gear.

The crank 36 this for convenience may also be referred to as a first crank.

The crank 37 this for convenience may also be referred to as a second crank.

The cam 174 this for convenience may also be referred to as a first cam.

The cam 181 this for convenience may also be referred to as a second cam.

Please Refer to FIG. 8b and FIG. 8a.

FIG. 8b is a perspective view of a cam shaft in gearbox 160 of FIG. 8a according to the present invention. The cam shaft 171 is installed by two shaft bearings 173 and 172 on an H-shaped frame 110. The H-shaped frame 110 consists of two vertical posts 197 and 200 are connected with each other by a horizontal post 199. The vertical post 200, its lower end is pivoted on a frame 205 by a pin 201. The vertical post 197, its lower end is pivoted on a frame 206 by a pin 202. A leaf spring 198 having an end 207 is fixed on the bottom of the gearbox 160 by bolts. The leaf spring 198 is pushing the horizontal post 199 towards the right surface of the gear 175. The leaf spring 198 acts against the force of the coil spring 193. The leaf spring 198 has suitable gauge to be its force equal three times approximately the force of the coil spring 193. The vertical frame 200 having an end 203 and the vertical frame 197 having an end 204 for prevention the H-shaped frame 110 swings towards the right surface of the gear 175 to be the H-shaped frame 110 standing vertically on the bottom of the gearbox 160. Two pivots at 201 and 202 to let the H-shaped frame 110 can slant towards the right if happened a difficulty on the engagement of the gear 178 and the gear 194 in FIG. 8a and after the gear 178 and gear 194 are engaged; the leaf spring 198 pushes the horizontal frame 199 towards the right surface of the gear 175 for standing the H-shaped frame 110 vertically.

The vertical frame 200 this for convenience may also be referred to as a first frame.

The vertical frame 197 this for convenience may also be referred to as a second frame.

The horizontal frame 199 this for convenience may also be referred to as a third frame.

The frame 205 this for convenience may also be referred to as a fourth frame.

The frame 206 this for convenience may also be referred to as a fifth frame.

The pin 201 this for convenience may also be referred to as a first pin.

The pin 202 this for convenience may also be referred to as a second pin.

Figure 8C:
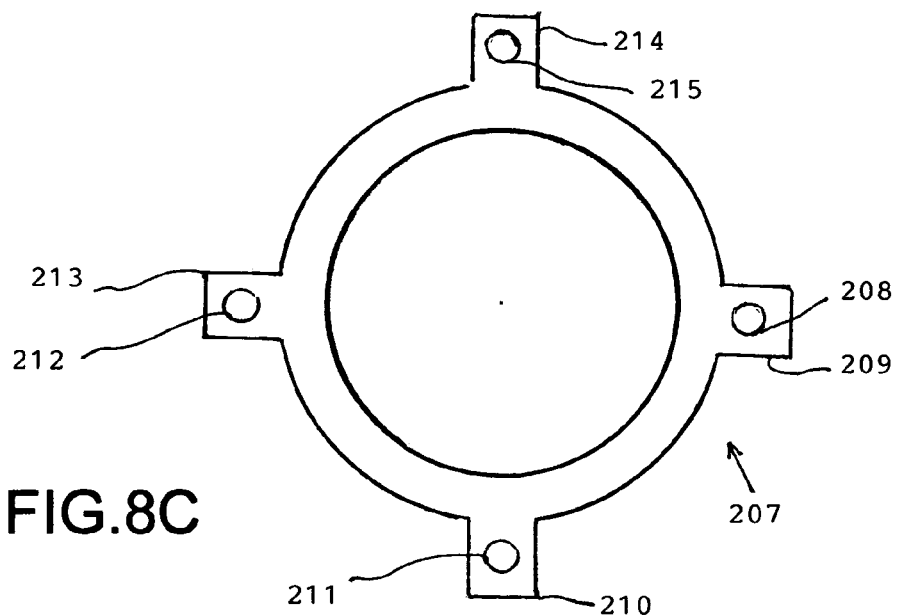
FIG. 8c is a plane view of a ring will install on a gear in FIG. 8a according to the present invention.
Figure 8D:
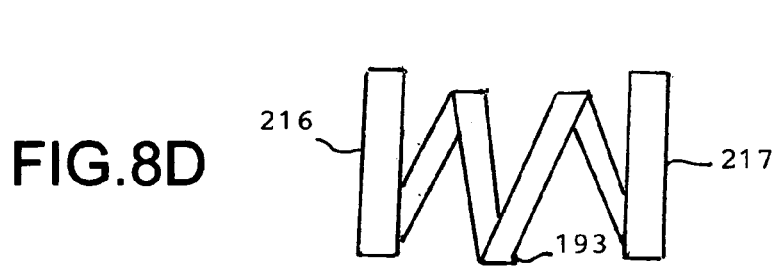
FIG. 8d is a perspective view of a coil spring in a gearbox of FIG. 8a according to the present invention.
Figure 8E:
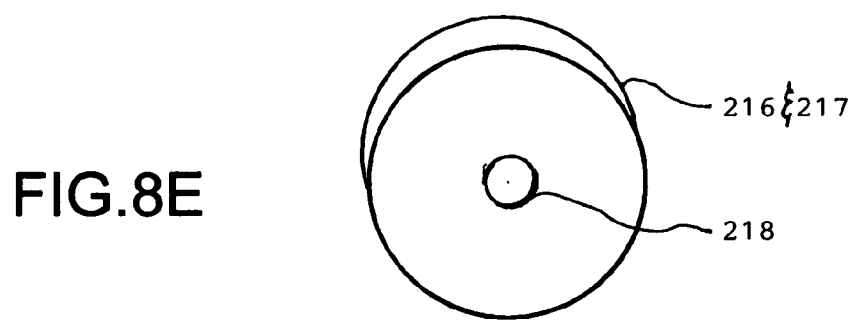
FIG. 8e is a plan view of an end plate of a coil spring in FIG. 8d according to the present invention.
Figure 8F:
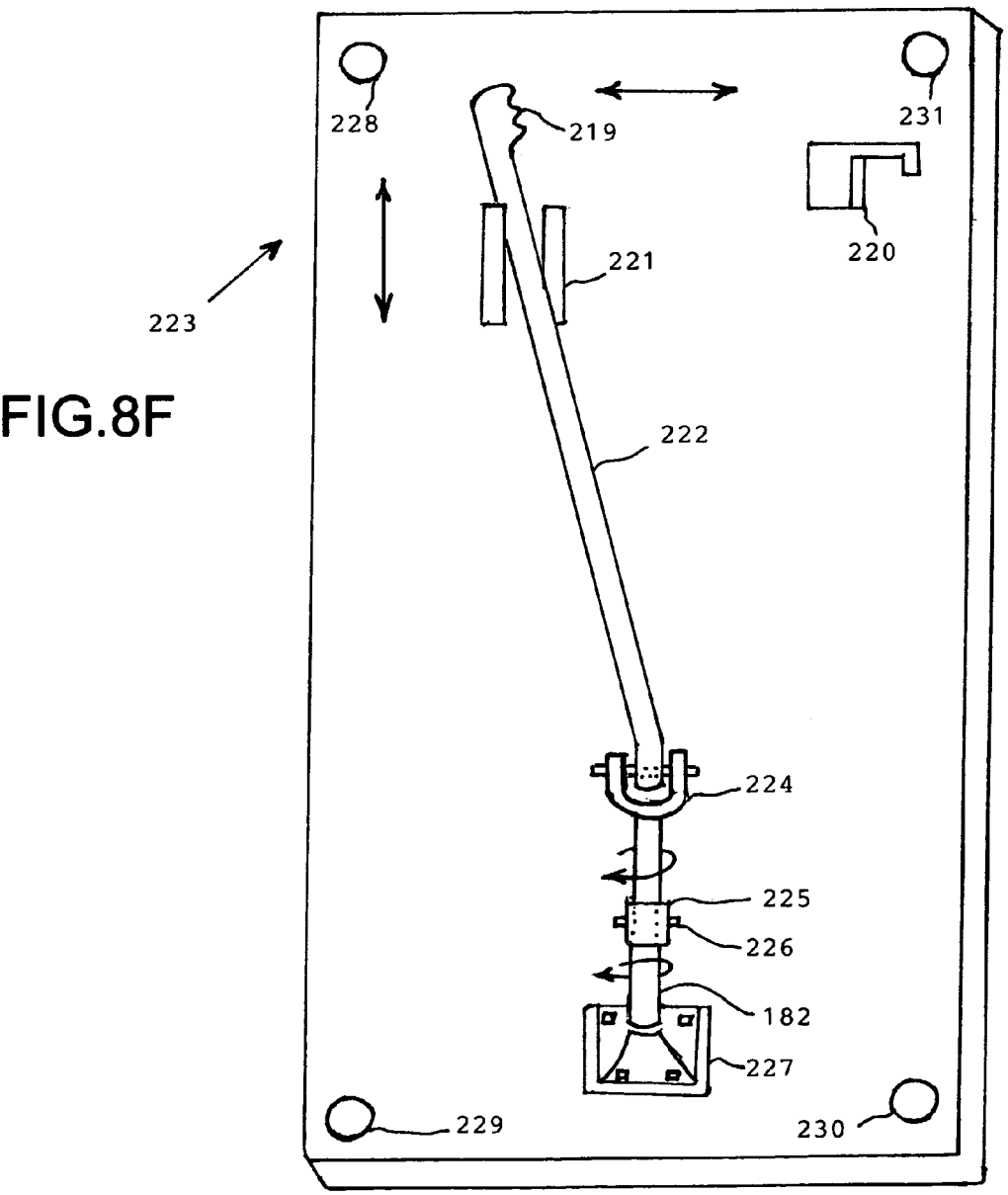
FIG. 8f is a perspective view of an upper cover for a gearbox in FIG. 8a according to the present invention.

Please Refer to FIG. 8c.

FIG. 8c is a perspective plan view of a ring will install on a gear in FIG. 8a according to the present invention. A ring 207 will install on the right surface of the gear 175 for protection the right surface of the gear 175 of the wear, because, the gear 175 is contacting the cam 174. The ring 207 having four arms 214, 213, 210, and 209. Four holes 215, 212, 211, and 208 for fixing the ring 207 on the right surface of the gear 175 by bolts.

Please Refer to FIG. 8d.

FIG. 8d is a perspective view of a coil spring in a gearbox of FIG. 8a according to the present invention. The coil spring 193 has two end plates 216 and 217 and each plate having a hole for installation the coil spring 193 on the shaft 179 to be each plate is free to slide on the shaft 179.

Please Refer to FIG. 8e.

FIG. 8e is a plan view of the end plate 216 or 217 of the coil spring 193 in FIG. 8d. Each end plate having a hole 218 for installation the coil spring 193 on the shaft 179 in FIG. 8a Please Refer to FIG. 8f.

FIG. 8f is a perspective view of an upper cover for a gearbox in FIG. 8a according to the present invention. A cover 223 is fixed on the gearbox 160 by bolts. Four holes 228, 231, 229, and 230 for installation the cover 223 on the body of gearbox 160 by bolts. A shaft bearing 227 for installation the cam shaft 182 of the cam 181 in FIG. 8a. A female 225 of a connecting piece 224 for installation the connecting piece 224 on an upper end of the cam shaft 182 by a pin 226. An arm 222 is pivoted at the upper end of the connecting piece 224 and a second end of the arm 222 having a handle 219 that is be used by the operator for rotation cam shaft 182 approximately a quarter revolution for stop the system. A frame 221 for keeping the arm 222 in its position. A frame 220 for keeping the arm 222 while the system is stopped.

Please Refer to FIG. 9.

FIG. 9 is a perspective view showing that two gearboxes can be combined with each other by a crankshaft for combination two systems to form one system according to the present invention. If two gearboxes 24 of FIG. 7a are be used in the system of FIG. 9; it is obvious that all components of the crankshaft 38 that is inside the gearbox 24 in FIG. 7a will be installed on a part of a crankshaft 232 that is inside the gearbox 24 in FIG. 9. If two gearboxes 160 of FIG. 8a are be used in the system of FIG. 9; all the components of the crankshaft 167 that installed inside the gearbox 160 of FIG. 8a will be installed on the part of the crankshaft 232 that is inside the gearbox 160 in FIG. 9. A brake disk 39 is fixedly secured on the crankshaft 232. A brake device 40 is installed on the frame 60 or the body of the gearbox. Three crankshaft journals 248, 249, and 235 for installation the crankshaft 232 on the system's frame 60 by shaft bearings. A crankpin 233 will install on the upper end 33 of the connecting rod 31 in FIG. 1a. A crankpin 237 will install on the upper end 32 of the connecting rod 30. The motion of both two crankpins 233 and 237 will be controlled by the right gearbox 24 or 160. A crank arm 234. A crank arm 236. A rectilinear angle between two crank arms 234 and 236. A crankpin 240 will install on the upper end 33 of the connecting rod 31 of a second system. A crankpin 244 will install on the upper end 32 of the connecting rod 30 of the second system. The left gearbox 160 or 24 regulates the motion of two crankpins 240 and 244. A crank arm 241. A crank arm 243. A rectilinear angle between two crank arms 241 and 243. A crank arm 239. A crank arm 238. There is an angle 90 degrees between the two crank arms 239 and 238 for stabilizing the output of the system. An output shaft 47.

The left gearbox 24 or 160 this for convenience may also be referred to as a first gearbox.

The right gearbox 24 or 160 this for convenience may also be referred to as a second gearbox.

The crankpin 244 this for convenience may also be referred to as a first crankpin.

The crankpin 240 this for convenience may also be referred to as a second crankpin.

The crankpin 237 this for convenience may also be referred to as a third crankpin.

The crankpin 233 this for convenience may also be referred to as a fourth crankpin.

The crank arm 243 this for convenience may also be referred to as a first crank arm.

The crank arm 241 this for convenience may also be referred to as a second crank arm.

The crank arm 239 this for convenience may also be referred to as a third crank arm.

The crank arm 238 this for convenience may also be referred to as a fourth crank arm.

The crank arm 236 this for convenience may also be referred to as a fifth crank arm.

The crank arm 234 this for convenience may also be referred to as a sixth crank arm.

What I claim as my invention is:

1. A system for transportation equipment and generation electricity by gravity and leaf springs comprising:
    a first beam is pivoted on a first Y-shaped frame to be said first beam free to oscillate;
    a first weight is fixedly secured on a first long end of said first beam for conversion potential energy of said first weight into oscillatory movement of said first beam;

a second beam is pivoted on a second Y-shaped frame to be said second beam free to oscillate;

a second weight is fixedly secured on said second beam for conversion potential energy of said second weight into oscillatory movement of said second beam;

a gearbox is fixed on a system frame for regulation oscillatory movement of said first beam and said second beam;

a crankshaft has two cranks and installed in said gearbox;

a brake disk is fixedly secured on said crankshaft;

an output shaft for imparting rotary motion of said gearbox;

a brake device is fixed on said gearbox for stopping said system;

a flywheel is fixedly secured on said output shaft, and having notches or sockets on its circumscription for engagement with a latch installed on a system's frame for keeping the said system stopping after the operator used the said braking device for stopping rotation of the said crankshaft;

an electric starter is installed on said gearbox for imparting rotary motion to said gearbox for starting said system;

a gear is fixedly secured on said flywheel for imparting rotary motion of said electric starter to said gearbox for starting said system;

a first crank is fixedly secured on the left external part of said crankshaft;

a second crank is fixedly secured on the right external part of said crankshaft;

a crankshaft having four cranks can be used instead of said crankshaft for combination two systems;

a first connecting rod is interconnecting a first short end of said first beam with said first crank for conversion oscillation of said first beam to rotary motion of said crankshaft;

a second connecting rod is interconnecting a second short end of said second beam with said second crank for conversion oscillation of said second beam to rotary motion of said crankshaft;

an additional beam or more than one can be interconnected with said first beam and said second beam by a transfer linkage for increasing an output of said system;

two assemblages of leaf springs, each one of them consists of two leaf springs or more are connecting said first long end of said first beam with a system's frame and said second long end of said second beam with said system's frame for conversion mechanical energy of said leaf springs to oscillatory motion of said first beam and said second beam with or without said first weight and said second weight;

a vise can be used as a strainer for said leaf springs;

a system frame for fixing said first Y-shaped frame, said second Y-shaped frame, a first rectangular frame, a second rectangular frame, a vertical frame, said gearbox, and an alternator thereon;

a shaft for imparting rotary motion of said gearbox to a third pulley and a fourth pulley for regulation said oscillation of said first beam and said second beam;

a third pulley is installed on an end of said shaft and connected with an end of a second chain;

a second chain is connecting said third pulley with said second long end of said second beam through a second coil spring for lifting said second long end of said second beam;

a second coil spring is connecting an end of said second chain with said second long end of said second beam for straining said second coil spring about one inch or suitable length on the straining of said second chain is equal three times approximately said second weight;

a fourth pulley installed on an end of said shaft and connected with a first chain;

a first chain is connecting said fourth pulley with said long end of said first beam through a first coil spring for lifting said first long end of said first beam on the descent of said second long end of said second beam;

a first coil spring is connecting an end of said first chain and said first long end of said first beam for straining said first coil about an inch or suitable length on the straining of said first chain is equal to three times approximately said first weight;

a vertical frame is fixed on said system frame for installation a horizontal frame thereon;

a horizontal frame is fixed on said vertical frame for installation a first pulley on its left end and a second pulley on its right end;

a first pulley is free to rotate and said first chain is trained thereon;

a second pulley is free to rotate and said second chain is trained thereon;

a first rectangular frame is fixedly secured on said system frame and having a bolster for protection said first beam;

a second rectangular frame is fixedly secured on said system frame and having a bolster for protection said second beam;

a first Y-shaped frame is fixedly secured on the said system frame;

a second Y-shaped frame is fixedly secured on the said system frame;

an alternator is installed on said system frame for recharging a battery of said electric starter; and a pulley is fixedly secured on said output shaft for imparting rotary motion to said alternator by a belt.

2. A system according to claim 1 wherein a first design of said gearbox includes:

a crankshaft is installed in said gearbox;

a first crank is installed on the external left end of said crankshaft;

a second crank is installed on the external right end of said crankshaft;

a twelfth gear is fixedly secured on said crankshaft;

a brake disk is fixedly secured on said crankshaft;

a sixth gear is fixedly secured on said crankshaft and engaging with a second gear for imparting rotary motion to a first shaft with faster rotational speed;

a first shaft is installed in said gearbox for imparting rotary motion of said gearbox to a machine needs said rotary motion;

a flywheel is fixedly secured on an external part of said first shaft;

a first gear is fixedly secured on said flywheel for imparting rotary motion of said electric starter to said gearbox to start said system;

a second gear is fixedly secured on said first shaft and engaged with said sixth gear for imparting rotation of said crankshaft to said first shaft;

a third cogged wheel is installed on said crankshaft by engagement a thirteenth gear with said twelfth gear, free to slide to the left or right on said crankshaft, driven by rotation of said crankshaft, cogged on its left surface to form a fourth gear, and cogged on its right surface to form a fifth gear;

a first drum is fixedly secured on the left surface of said third cogged wheel by its flat edge, having 50% low edge and 50% high edge approximately on its external end, and contacted a first frame for sliding said third cogged wheel to the right on the contacting of a first frame with a high external edge of said first drum during the contacting of a second frame with a low external edge of a second drum for disengagement a fourth gear and a seventh gear, at the same time, engagement a fifth gear with an eleventh gear;

a second drum is fixedly secured on the right surface of said third cogged wheel by its flat edge, having 50% low edge and 50% high edge approximately on its external end, and contacted a second frame for sliding said third cogged wheel to the left on the contacting of second frame with said high external edge of said second drum during the contacting of a first frame with said low edge of said first drum for disengagement an eleventh gear and a fifth gear, at the same time, engagement a fourth gear with a seventh gear;

a first frame is fixedly secured on the bottom of said gearbox and contacted said first drum;

a second frame is fixedly secured on the bottom of said gearbox and contacted said second drum;

a seventh gear is fixedly secured on a second shaft for imparting rotary motion of a fourth gear to a fourth shaft through a second shaft, an eighth gear, a ninth gear, and a tenth gear on the contacting of said high external edge of said second drum with said second frame;

an eighth gear is fixedly secured on a second shaft and engaged with a ninth gear for imparting rotary motion of a second shaft to a ninth gear;

a second shaft is installed on said gearbox for imparting rotary motion of said seventh gear to said eighth gear;

a third shaft is an axle for a ninth gear;

a ninth gear is fixedly secured on said third shaft and engaged with said eighth gear and a tenth gear for imparting rotary motion to a tenth gear with reverse direction than that of an eleventh gear for changing said rotary direction of said fourth shaft;

a tenth gear is fixedly secured on a fourth shaft and engaged with said ninth gear;

an eleventh gear is fixedly secured on said fourth shaft, engages with a fifth gear on the contacting of said first frame with said high edge of said first drum for imparting rotary motion of a fifth gear to a fourth shaft with reverse direction than that of the said tenth gear, and disengages off a fifth gear on the contacting of said first frame with said low edge of said first drum, at the same time, contacting said second frame with said high edge of said second drum for engagement said fourth gear with said seventh gear for imparting rotary motion with a reverse rotary direction to a fourth shaft through a second shaft, an eighth gear, a ninth gear, and a tenth gear; and a fourth shaft is installed in said gearbox and imparts kinetic energy of said gearbox to said first beam and the said second beam through said third pulley and said fourth pulley for regulation their oscillation.

3. A system according to claim 1 wherein a second design of said gearbox includes:

a crankshaft is installed in said gearbox;

a first crank is fixedly secured on an external left end of said crankshaft for conversion said oscillation of said first beam to rotary motion of said crankshaft;

a second crank is fixedly secured on the right external end of said crankshaft for conversion said oscillation of said second beam to rotary motion of said crankshaft;

a third gear is fixedly secured on said crankshaft, engaged with a second gear for imparting rotary motion of said crankshaft to a second gear, and engaged with a seventh gear for imparting rotary motion of said crankshaft to a seventh gear;

a second gear is fixedly secured on a first shaft and engaged with said third gear for imparting rotary motion of said third gear to a first shaft;

a first shaft is installed in said gearbox for imparting rotary motion of said system to a machine needs said rotary motion;

a flywheel is fixedly secured on said first shaft;

a first gear is installed on said flywheel for imparting rotary motion of a pinion gear of an electric starter for starting said system;

an electric starter is fixedly secured on said gearbox for starting said system and runs by a rechargeable battery;

a brake disk is fixedly secured on said crankshaft for stopping said system;

a brake device is fixedly secured on said gearbox for stopping the said system;

a seventh gear is a reverse idler gear engaged with said third gear and an eighth gear for imparting rotary motion of said third gear to a fourth shaft through an eighth gear, a ninth gear, a tenth gear, an eleventh gear, a thirteenth gear, a third shaft, a fourteenth gear, and a fifteenth gear on the contacting of a first cam's projection with the right surface of an eleventh gear;

an eighth gear is fixedly secured on a second shaft and engaged with said seventh gear for imparting rotary motion of said seventh gear to a tenth gear through a ninth gear;

a ninth gear is fixedly secured on the right surface of said eighth gear and engages with a tenth gear on the contacting of a first cam's projection with the right surface of an eleventh gear for imparting rotary motion of a ninth gear to a tenth gear;

a tenth gear is fixedly secured on the left surface of an eleventh gear;

an eleventh gear is installed on a second shaft, free to slide on its shaft to the right by a coil spring or left by a projection of a first cam, and engaged with a thirteenth gear;

a ring is fixedly secured on the right surface of said eleventh gear for protection said eleventh gear of the wear due to contacting said eleventh gear with a first cam;

a twelfth gear is fixedly secured on the right surface of said eleventh gear, engages with a fourth gear on the contacting of a low edge of a first cam with the right surface of said eleventh gear for imparting rotary motion of a fourth gear to said eleventh gear;

a second shaft for installation said eighth gear, said eleventh gear, and a coil spring thereon;

a coil spring is installed on said second shaft by two end plates between said eighth gear and said eleventh gear for sliding said eleventh gear to the right on the contacting of a low edge of a first cam with the right surface of said eleventh gear for disengagement said ninth gear and said tenth gear, at the same time, engagement a fourth gear and said twelfth gear for imparting rotary motion to a fourth shaft through a twelfth gear, an eleventh gear, a thirteenth gear, a third shaft, a fourteenth gear, and a fifteenth gear with reverse direction than that of said ninth gear;

a third shaft for imparting rotary motion of a thirteenth gear to a fourteenth gear;

a thirteenth gear is fixedly secured on said third shaft and engaged with said eleventh gear;

a fourteenth gear is fixedly secured on said third shaft and engaged with a fifteenth gear;

a fifteenth gear is fixedly secured on a fourth shaft;

a fourth gear is fixedly secured on said crankshaft for imparting rotary motion to said twelfth gear on the contacting of a low edge of a first cam with the right surface of said eleventh gear;

a fifth gear is fixedly secured on the right surface of said fourth gear and engaged with a sixth gear for imparting rotary motion to a first cam through a first cam shaft;

a first cam shaft is installed in two shaft bearings on an H-shaped frame for imparting rotary motion of said sixth gear to a first cam;

a first cam is fixedly secured on an end of said first cam shaft, 50% of its edge approximately is a projection and 50% is a low edge, contacted the right surface of said eleventh gear, rotates a half revolution after the descent of said first beam or said second beam from upper extreme position to lower extreme position, and push the right surface of said eleventh gear to slide to the left for disengagement said fourth gear and said twelfth gear, at the same time, engagement said tenth gear and said ninth gear for imparting rotary motion with reverse direction than that of said fourth gear to a fourth shaft;

a fourth shaft is installed in said gearbox by an end for imparting rotary motion of said fifteenth gear that is installed on its end to said third pulley and said fourth pulley that will install on its external end for lifting said first beam or said second beam through linkages when any one of them reaches to lower extreme position for regulation their oscillation;

a second cam is fixedly secured on a second cam shaft and rotates a quarter revolution by the operator for pushing the right surface of said eleventh gear to the left for stopping said system by disengagement said fourth gear and said twelfth gear; and a second cam shaft is installed on a bottom of said gearbox by a shaft bearing and its upper end is installed in a cover of said gearbox by a bearing, connected with an arm at its upper end, and rotates a quarter revolution approximately by the operator who use said arm to stop said system.

4. A system according to claim 3, wherein said H-shaped frame includes:

A first frame is pivoted to a fourth frame by a first pin, having a projection at its lower end for keeping said H-shaped frame stand vertically, able to slant to one direction only if happened any difficulty on the engagement of said ninth gear and said tenth gear, connected with a third frame, and having a shaft bearing on its upper end for installation said first cam shaft;

a fourth frame is fixedly secured on a bottom of said gearbox and pivoted with the lower end of said first frame by a first pin;

a second frame is identical with said first frame, pivoted with a fifth frame by a second pin, having a shaft bearing on its upper end for installation said first cam shaft, fixedly secured with a third frame, and able to slant to one direction only if happened any difficulty on the engagement of said ninth gear and said tenth gear;

a fifth frame is fixedly secured on a bottom of said gearbox and pivoted with a lower end of said second frame by a second pin; and a third frame is connecting said first frame with said second frame and pushed towards the right surface of said eleventh gear by an upper end of a leaf spring for keeping said first cam contacting with the right surface of said eleventh gear.

5. A system according to claim 1, wherein said first pulley and said second pulley each one of them includes:

a first pulley component having one end plate or flange and two sockets for installation a second pulley component on said first pulley component;

a second pulley component is made of rubber or suitable material having two teeth for installation said second pulley component on said first pulley component for prevention the noise on the running of said system; and a third pulley component is an end plate or flange having a central hole for installation said third pulley component on an axle of said first pulley component and four small holes for installation said third pulley component on said first pulley component by bolts.

6. A system according to claim 1, wherein said vise is be connected with said first long end of said first beam and said second long end of said second beam by the following components:

a second flexible cable is connecting a first link and a first assemblage of leaf springs;

a first assemblage of leaf springs having two or more than two of identical leaf springs for connection between said second flexible cable and a first flexible cable;

a first flexible cable is connecting said first assemblage of leaf springs and said first long end of said first beam and trained on a first pulley;

a first pulley is installed on said system frame and free to rotate for training said first flexible cable thereon;

a fourth flexible cable is connecting a second link and a second assemblage of leaf springs;

a second assemblage of leaf springs having two or more of identical leaf springs for connection said fourth flexible cable and a third flexible cable;

a third flexible cable is trained on a second pulley and connecting said second assemblage of leaf springs with said second long end of said second beam; and a second pulley is installed on said system frame and free to rotate for training said third flexible cable thereon.

7. A system according to claim 1, wherein said additional beam is pivoted on a second frame and interconnected with said first long end of said first beam or said second long end of said second beam by the following components:

a first rack is fixedly secured on an end of said additional beam and engaged with a second gear for imparting oscillatory movement of said additional beam to a second gear;

a second gear is fixedly secured on a shaft for imparting oscillatory movement of said first rack to a first pulley;

a first pulley is fixedly secured on said shaft and interconnected with said first long end of said first beam or said second long end of said second beam by two chains for pulling said first long end of said first beam or said second long end of said second beam to down;

a turnbuckle on an end of a connecting piece for connection said two chains with each other; and an arm is fixedly secured on said additional beam and contacted an under surface of said first beam or said second beam for lifting said first beam or said second beam by said additional beam that is be lifted by said first chain or said second chain of said system.

8. A system according to claim 1, wherein combination two systems with each other by one crankshaft includes:
   a first crankpin interconnects with said upper end of said first connecting rod and move under control a first gearbox;
   a second crankpin interconnects with said upper end of said second connecting rod and move under control a first gearbox;
   a first crank arm having an angle 180 degrees with a second crank arm;
   a third crankpin interconnects with said upper end of said first connecting rod and move under control a second gearbox;
   a fourth crankpin interconnects with said upper end of said second connecting rod and move under controlling of a second gearbox;
   a fifth crank arm having an angle 180 degrees with a sixth crank arm; and
   a third crank arm having an angle 90 degrees with a fourth crank arm for stabilizing said system's output.

* * * * *